Figure 1:
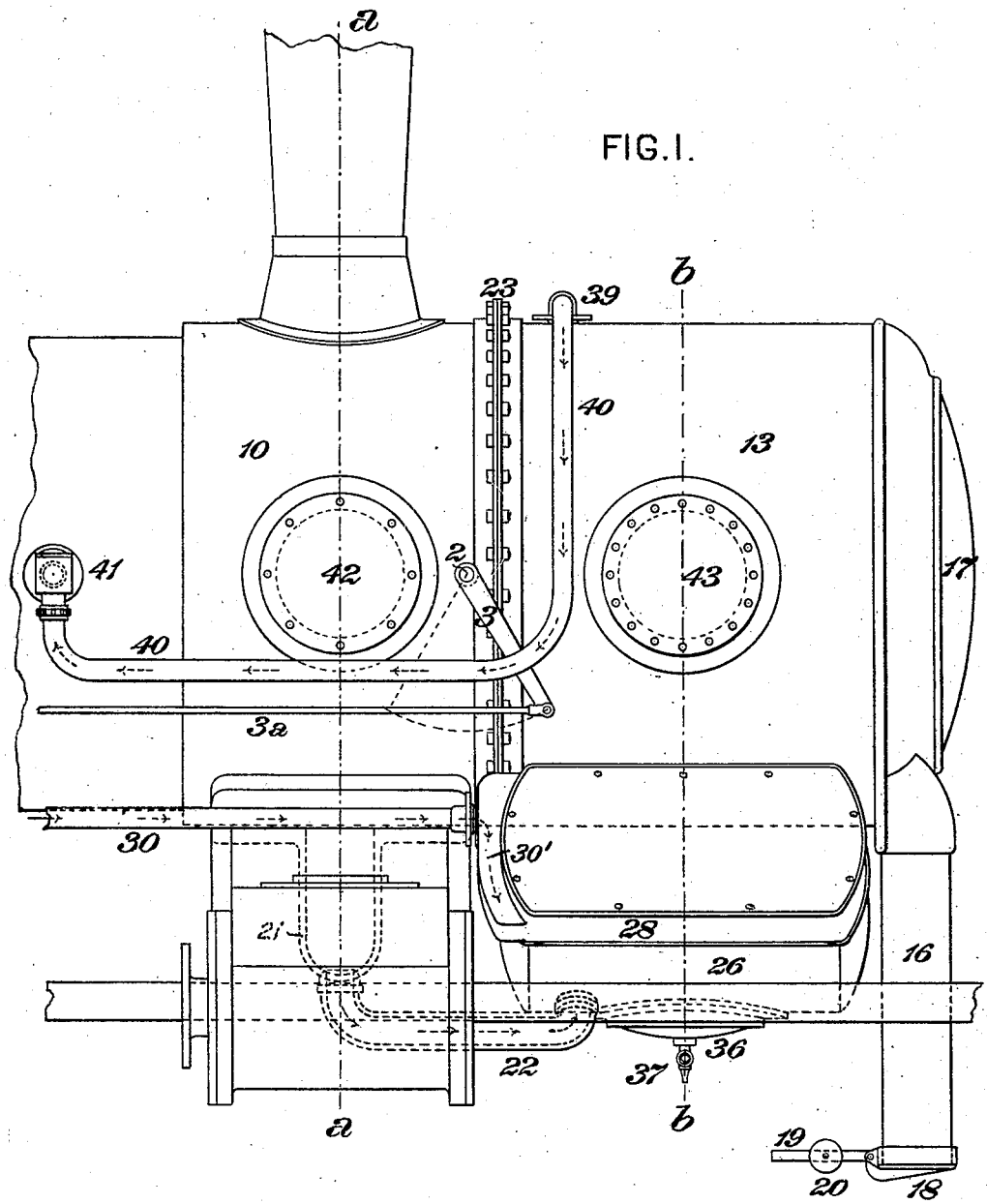

No. 688,402. Patented Dec. 10, 1901.
M. N. FORNEY.
FEED WATER AND STEAM HEATER FOR STEAM BOILERS.
(Application filed June 19, 1901.)
(No Model.) 15 Sheets—Sheet 1.

WITNESSES:
James C. Herron.
S. R. Bell.

INVENTOR
M. N. Forney
by J. Snowden Bell,
ATTORNEY

No. 688,402. Patented Dec. 10, 1901.
M. N. FORNEY.
FEED WATER AND STEAM HEATER FOR STEAM BOILERS.
(Application filed June 19, 1901.)
(No Model.) 15 Sheets—Sheet 2.

WITNESSES: INVENTOR
ATTORNEY

No. 688,402. Patented Dec. 10, 1901.
M. N. FORNEY.
FEED WATER AND STEAM HEATER FOR STEAM BOILERS.
(Application filed June 19, 1901.)
(No Model.) 15 Sheets—Sheet 3.
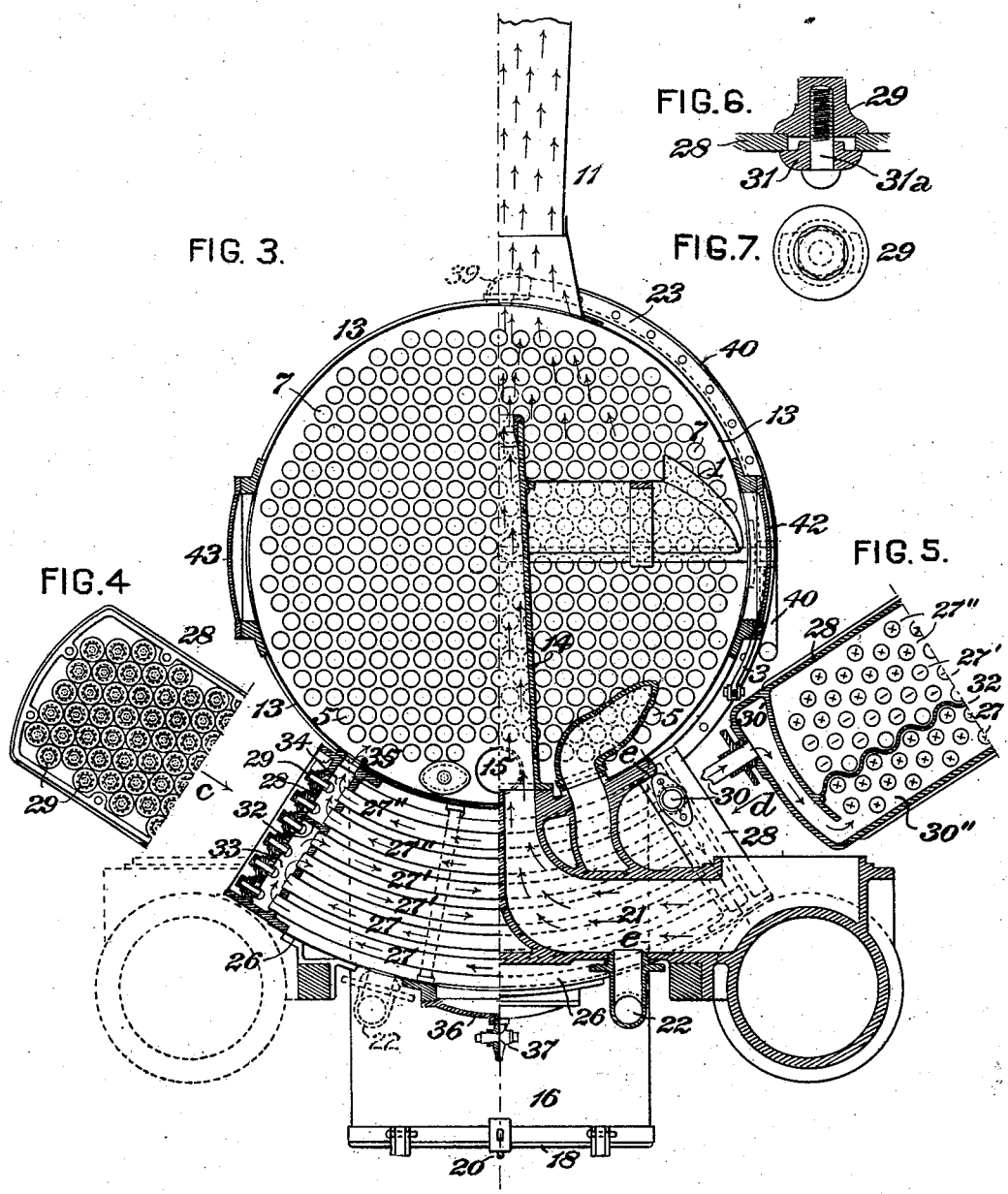
WITNESSES:
James C. Herron
S. R. Bell
INVENTOR
M. N. Forney
by Snowden Bell,
ATTORNEY No. 688,402. Patented Dec. 10, 1901.
M. N. FORNEY.
FEED WATER AND STEAM HEATER FOR STEAM BOILERS.
(Application filed June 19, 1901.)
(No Model.) 15 Sheets—Sheet 4.

WITNESSES: James C. Herron. S. R. Bell.

INVENTOR M. N. Forney, by Snowden Bell, ATTORNEY

No. 688,402. Patented Dec. 10, 1901.
M. N. FORNEY.
FEED WATER AND STEAM HEATER FOR STEAM BOILERS.
(Application filed June 19, 1901.)
(No Model.) 15 Sheets—Sheet 5.
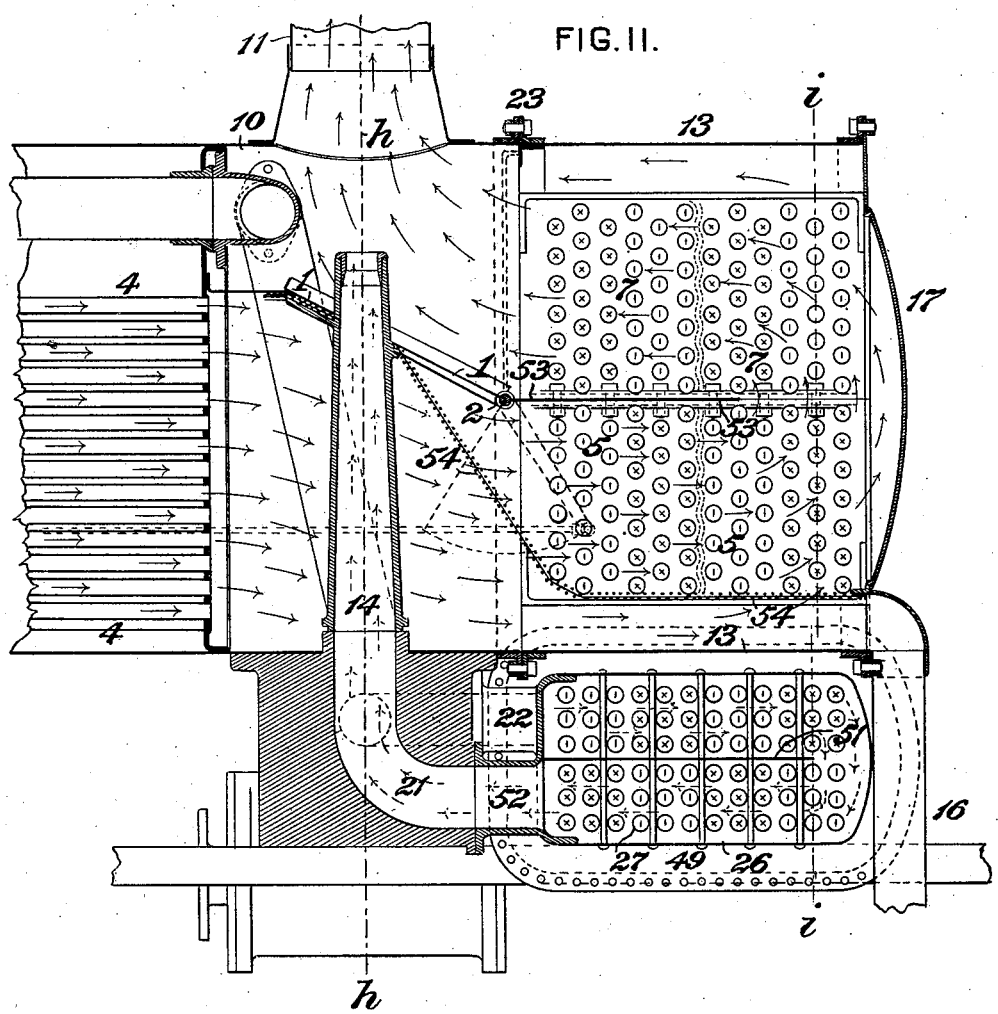
FIG. II.
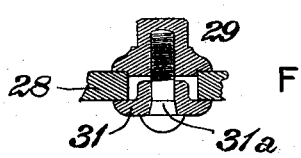
FIG. 12.
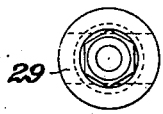
FIG. 13.
WITNESSES:
James C. Herron
S. R. Bell
INVENTOR
M. N. Forney
by J. Snowden Bell
ATTORNEY No. 688,402. Patented Dec. 10, 1901.
M. N. FORNEY.
FEED WATER AND STEAM HEATER FOR STEAM BOILERS.
(Application filed June 19, 1901.)
(No Model.) 15 Sheets—Sheet 6.

WITNESSES: INVENTOR

No. 688,402. Patented Dec. 10, 1901.
M. N. FORNEY.
FEED WATER AND STEAM HEATER FOR STEAM BOILERS.
(Application filed June 19, 1901.)
(No Model.) 15 Sheets—Sheet 7.

WITNESSES: INVENTOR

No. 688,402. Patented Dec. 10, 1901.
M. N. FORNEY.
FEED WATER AND STEAM HEATER FOR STEAM BOILERS.
(Application filed June 19, 1901.)
(No Model.) 15 Sheets—Sheet 8.

WITNESSES: INVENTOR
ATTORNEY

No. 688,402.  
M. N. FORNEY.  
FEED WATER AND STEAM HEATER FOR STEAM BOILERS.  
(Application filed June 19, 1901.)  
(No Model.)  
Patented Dec. 10, 1901.  
15 Sheets—Sheet 9.

WITNESSES:  
INVENTOR  
ATTORNEY

No. 688,402. Patented Dec. 10, 1901.
M. N. FORNEY.
FEED WATER AND STEAM HEATER FOR STEAM BOILERS.
(Application filed June 19, 1901.)
(No Model.) 15 Sheets—Sheet 11.
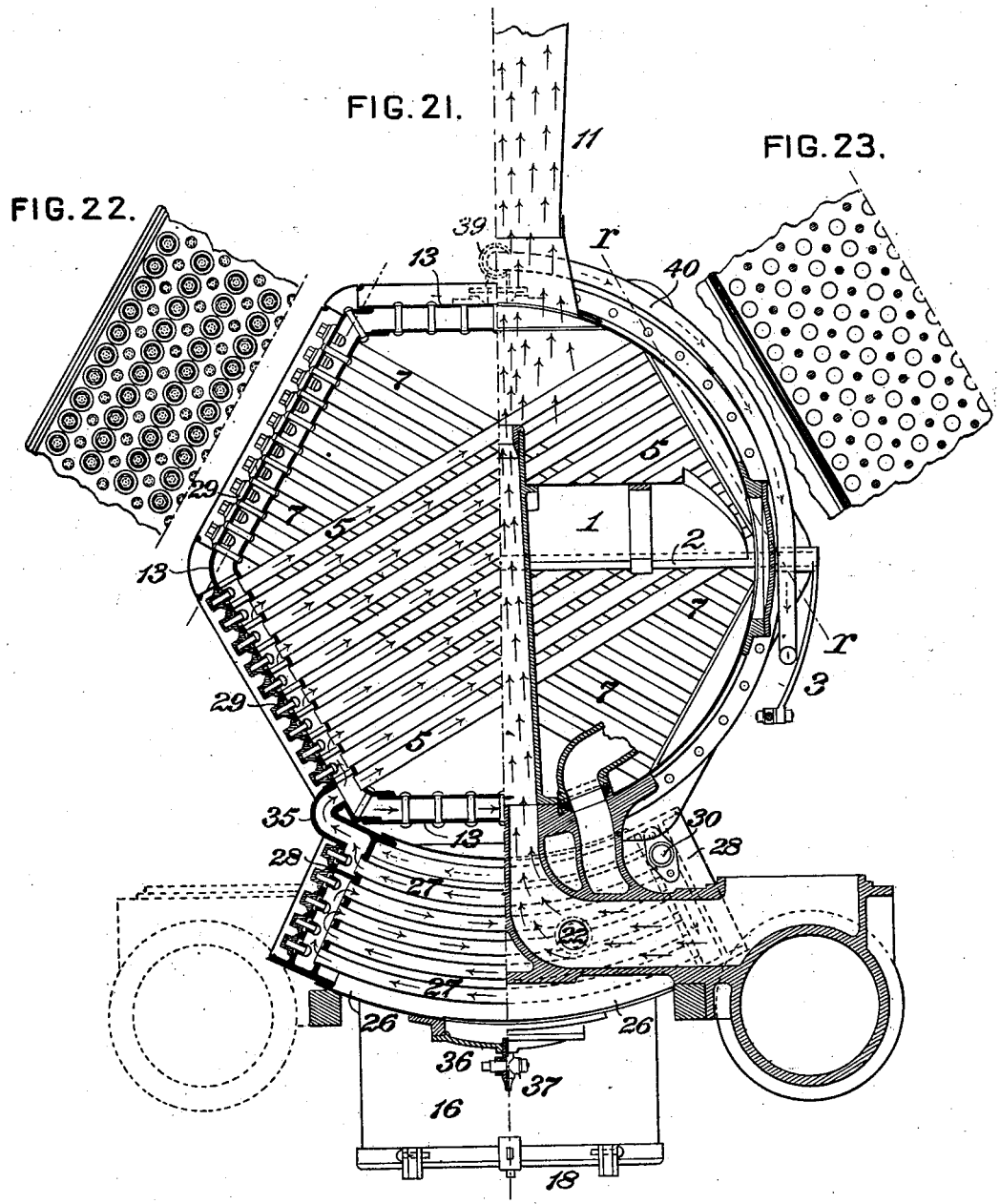
WITNESSES:
James C. Herron.
S. R. Bell.
INVENTOR
M. N. Forney,
by J. Snowden Bell,
ATTORNEY No. 688,402. Patented Dec. 10, 1901.
M. N. FORNEY.
FEED WATER AND STEAM HEATER FOR STEAM BOILERS.
(Application filed June 19, 1901.)

(No Model.) 15 Sheets—Sheet 12.

WITNESSES:
James C. Herron.
S. R. Bell.

INVENTOR
M. N. Forney.
by J. Snowden Bell,
ATTORNEY

No. 688,402.
Patented Dec. 10, 1901.
M. N. FORNEY.
FEED WATER AND STEAM HEATER FOR STEAM BOILERS.
(Application filed June 19, 1901.)
(No Model.)
15 Sheets—Sheet 13.
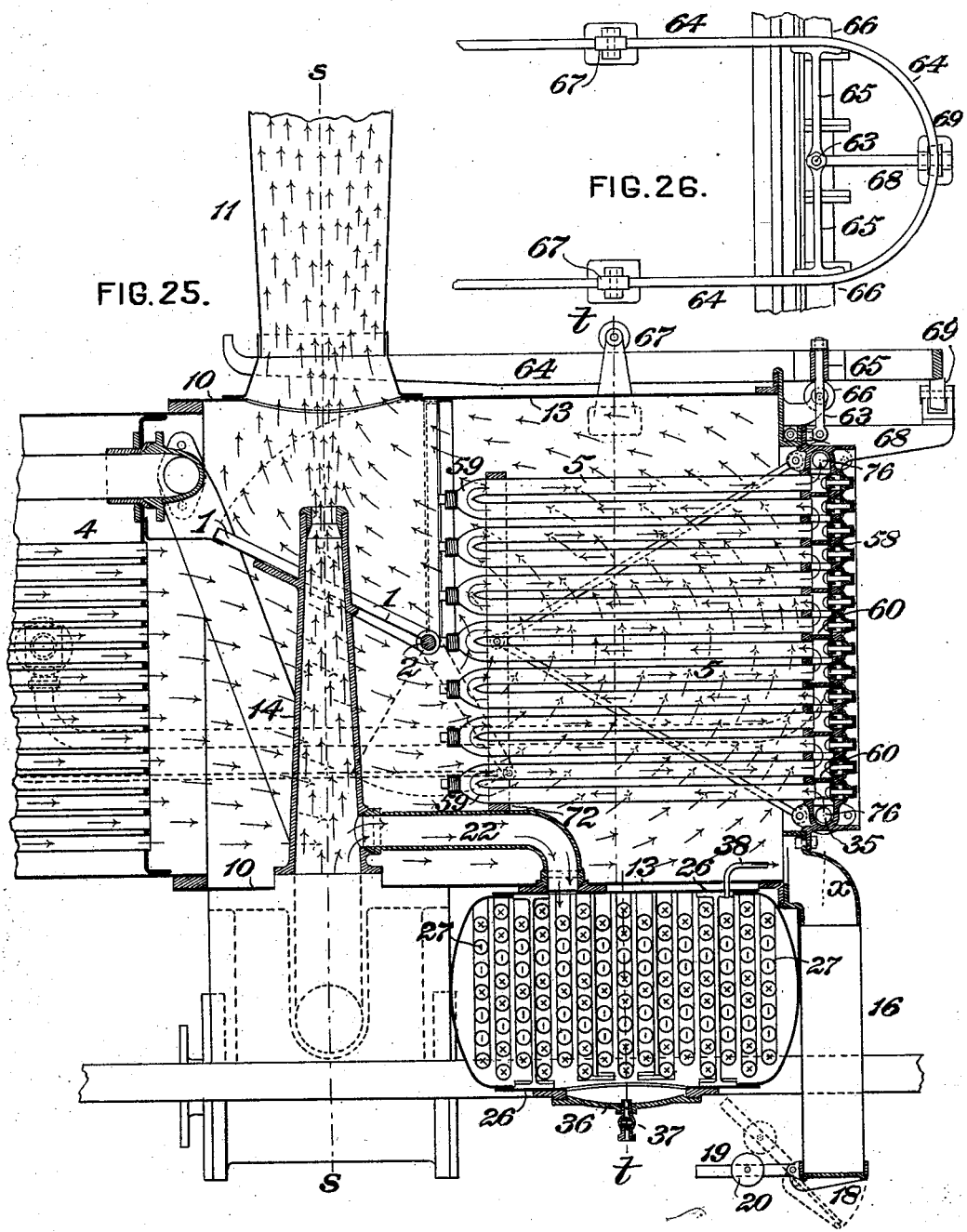
WITNESSES:
James C. Herron.
S. R. Bell.
INVENTOR
M. N. Forney
by Snowden Bell,
ATTORNEY No. 688,402. Patented Dec. 10, 1901.
M. N. FORNEY.
FEED WATER AND STEAM HEATER FOR STEAM BOILERS.
(Application filed June 19, 1901.)
(No Model.) 15 Sheets—Sheet 14.
FIG. 27.
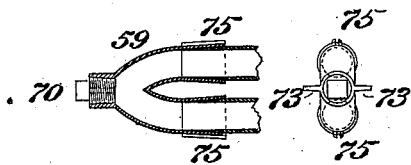
FIG. 28a. FIG. 28b.
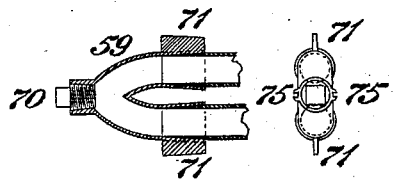
FIG. 28c. FIG. 28d.
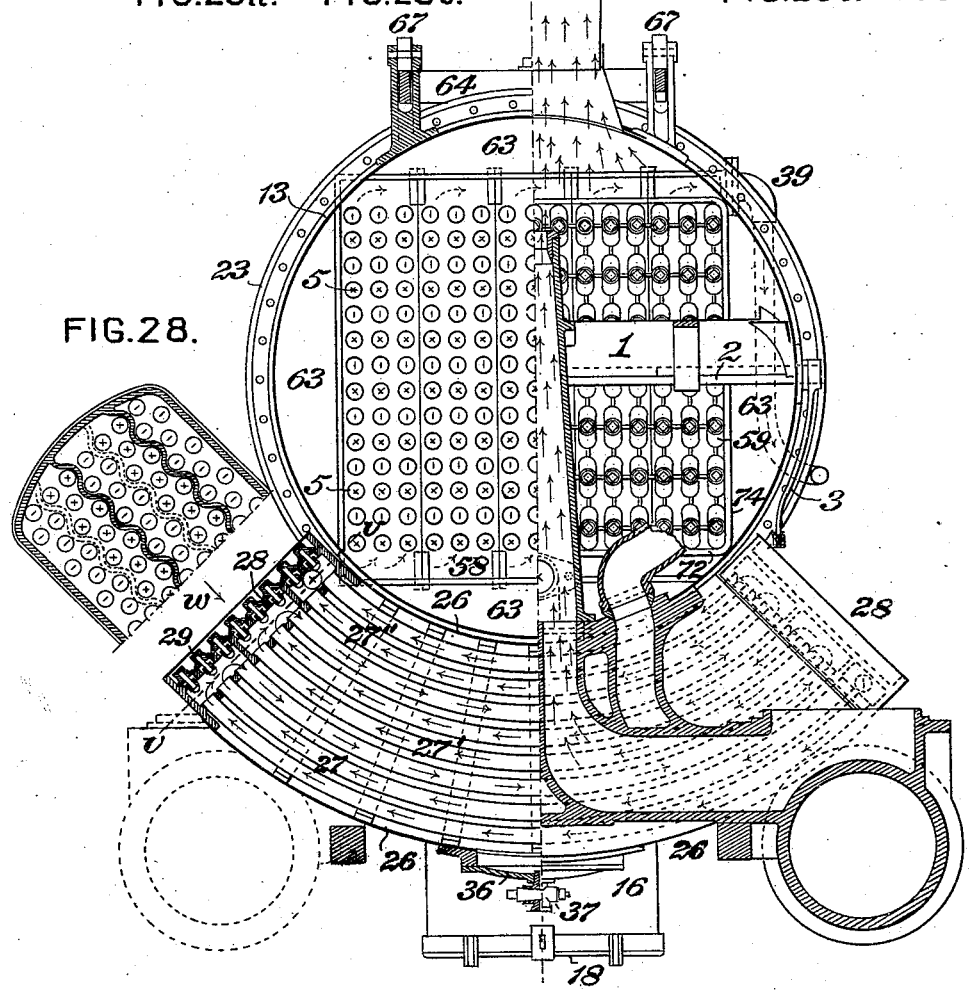
FIG. 28.
WITNESSES:
James C. Herron.
S. R. Bell.
INVENTOR
M. N. Forney.
by Snowden Bell
ATTORNEY
THE NORRIS PETERS CO., PHOTO-LITHO., WASHINGTON, D. C.

No. 688,402. Patented Dec. 10, 1901.
M. N. FORNEY.
FEED WATER AND STEAM HEATER FOR STEAM BOILERS.
(Application filed June 19, 1901.)
(No Model.) 15 Sheets—Sheet 15.

WITNESSES:
INVENTOR

UNITED STATES PATENT OFFICE.

MATTHIAS N. FORNEY, OF NEW YORK, N. Y.

FEED-WATER AND STEAM HEATER FOR STEAM-BOILERS.

SPECIFICATION forming part of Letters Patent No. 688,402, dated December 10, 1901.

Application filed June 19, 1901. Serial No. 65,209. (No model.)

*To all whom it may concern:*

Be it known that I, MATTHIAS N. FORNEY, of the borough of Manhattan, in the city and State of New York, have invented a certain new and useful Improvement in Feed-Water and Steam Heaters for Steam-Boilers, of which improvement the following is a specification.

My present invention relates more particularly to feed-water or steam heaters for steam-boilers of the locomotive type; but it is also applicable to boilers of other forms. Its objects are to provide means whereby the exhaust-steam after it escapes from the cylinders will impart a portion of its heat to the feed-water before the feed-water enters the boiler and also means whereby a portion of the heat from the products of combustion, which ordinarily escapes from the boiler-tubes and passes out of the chimney, will be communicated to the feed-water before it enters the boiler or to the steam before it enters the cylinders; also, means by which the products of combustion may be made to circulate in contact with tubes containing or surrounded by the feed-water or steam to be heated or may be conducted directly from the boiler-tubes to the chimney; also, appliances in operative combination with the heater-tubes for collecting cinders and sparks and discharging them when steam is shut off from the locomotive; also, mechanism for readily removing a coil of pipes or other appliances for heating feed-water or steam from the smoke-box to repair or clean it; also, means which will permit of a difference in the expansion or contraction of the tubes in which the water is heated and of the inclosures in which they are contained.

To these ends my invention, generally stated, consists in certain novel combinations, hereinafter set forth, comprising an exhaust-heater in which the feed-water is heated by the exhaust-steam, said heater having a chamber or chambers placed, preferably, in proximity to the smoke-box and a plurality of tubes which either contain or are surrounded by the feed-water and through or around which the exhaust-steam may circulate, said chambers and tubes being so constructed as to permit of a difference of expansion or contraction between the tubes and the inclosure in which they are contained, partitions being provided in said chambers to cause the water to circulate successively through all the tubes and external openings and removable covering-plates opposite the ends of the heating-tubes and communicating with and giving access to them; a fire-heater in which the water is heated by the smoke and gases from the fire after they have passed through the boiler-tubes, said heater having a plurality of tubes through or around which waste products of combustion may be passed before being discharged into the chimney and around or through which feed-water may be circulated; means for supplying feed-water to the exhaust-heater; a conduit for the transfer of feed-water from the exhaust-heater to the fire-heater; a conduit for the delivery of feed-water from the fire-heater to the boiler; a device for controlling the traverse of waste products of combustion either directly to the chimney or intermediately through the fire-heater; a receptacle for the retention of solid products of combustion after their separation from smoke and gases in passing through the fire-heater; a device for discharging solid matter from said receptacle, and a device for effecting the removal and replacement of the fire-heater from the smoke-box for purposes of cleaning or repair.

Before proceeding with a detailed description of my improvement it should be understood that in all the plans shown the feed-water is heated in two stages—first by the exhaust-steam and next by the waste gases and products of combustion. For clearness and brevity, therefore, the heater in which the exhaust-steam is used as the agent for heating will be called the "exhaust-heater" and the other the "fire-heater." These two heating appliances may be used separately, but the maximum advantageous results may be attained by combining them. The fire-heater or a portion of it may be employed for superheating the steam after it leaves the boiler and before it enters the cylinders or in compound engines for reheating it in its passage from the high to the low pressure cylinders.

The fire-heaters which I have devised consist of a plurality of heating-tubes which are contained within or are in proximity to the smoke-box. These either contain or are surrounded by the feed-water or steam to be heated, and the waste gases from the boiler before they escape out of the chimney are caused to circulate through or around these heater-tubes. The feed-water is first heated in the exhaust-heater and is then delivered into the fire-heater, in which an additional amount of heat is imparted to it by the waste gases of combustion. The heating-tubes of the fire-heater, which contain water, are also provided with covering-plates opposite to the ends of the tubes, so as to give ready access to them for cleaning and repairs.

My invention further comprehends a partition or diaphragm in the smoke-box provided with a door or valve by which the lower portion of the smoke-box may be separated from the upper part, and the products of combustion may thereby be conducted through or around the tubes of the fire-heater, or when said door is opened the smoke and waste gases may escape directly out of the chimney. The purpose of this device is to lessen the obstruction to the draft caused by the circulation of the products of combustion through or around the heating-tubes, and thus permit the full power of the exhaust-steam blast to be exerted on the fire when it is required. The fire-heaters herein described might, however, be used without such a partition or without a door or valve connected to it.

In the form of fire-heater herein described, Figures 1 to 7, in which the heating-tubes are surrounded by instead of containing the feed-water, the smoke and gases pass from the lower part of the main smoke-box through the lower heater-tubes and return through the upper ones to the upper section of the smoke-box and thence to the chimney. In other forms the heating-tubes contain the water to be heated and are all provided with external openings and covering-plates opposite to their ends, which can readily be removed to clean and repair the tubes, and suitable partitions are provided at their ends to cause the water to circulate successively through the tubes. A receptacle for sparks and cinders is also provided with a door for discharging them, as will hereinafter be more fully described.

Figure 2:
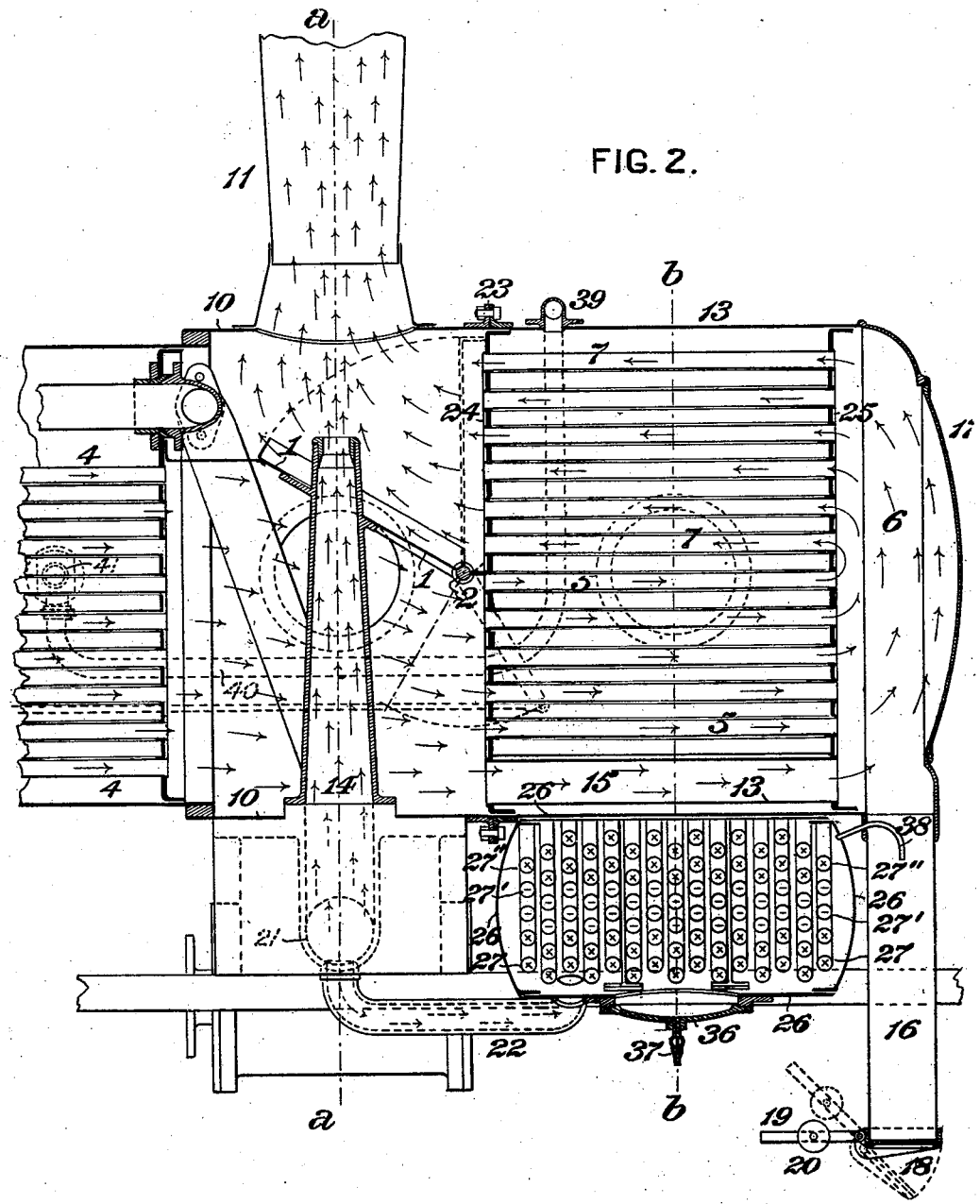
Figure 8:
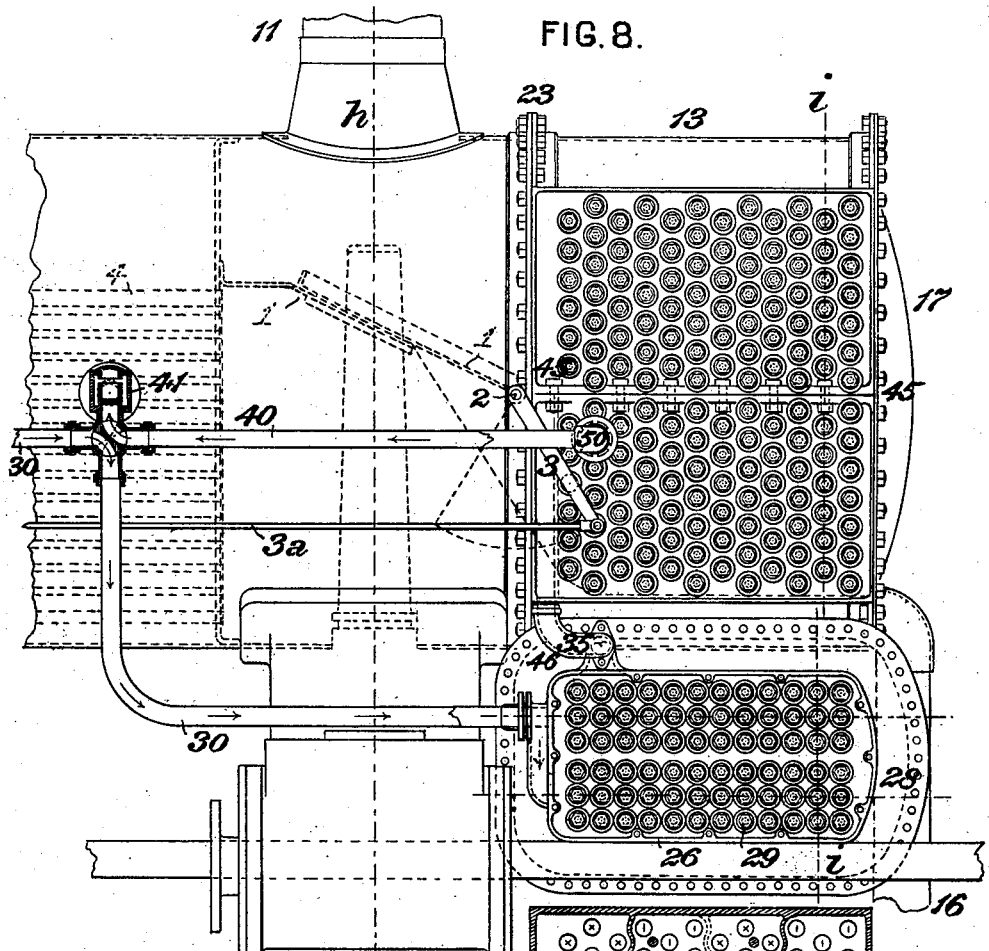
Figure 9:
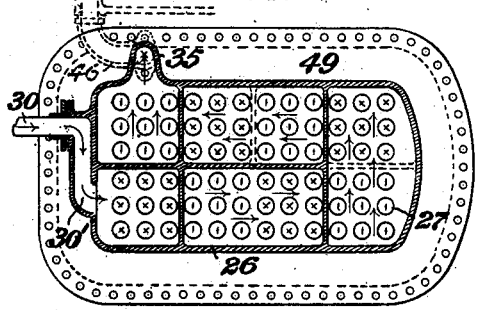
Figure 10:
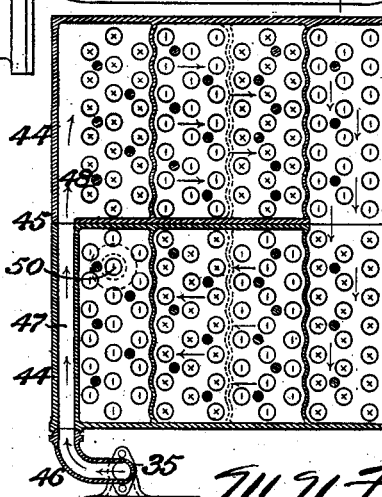
Figures 14, 15:
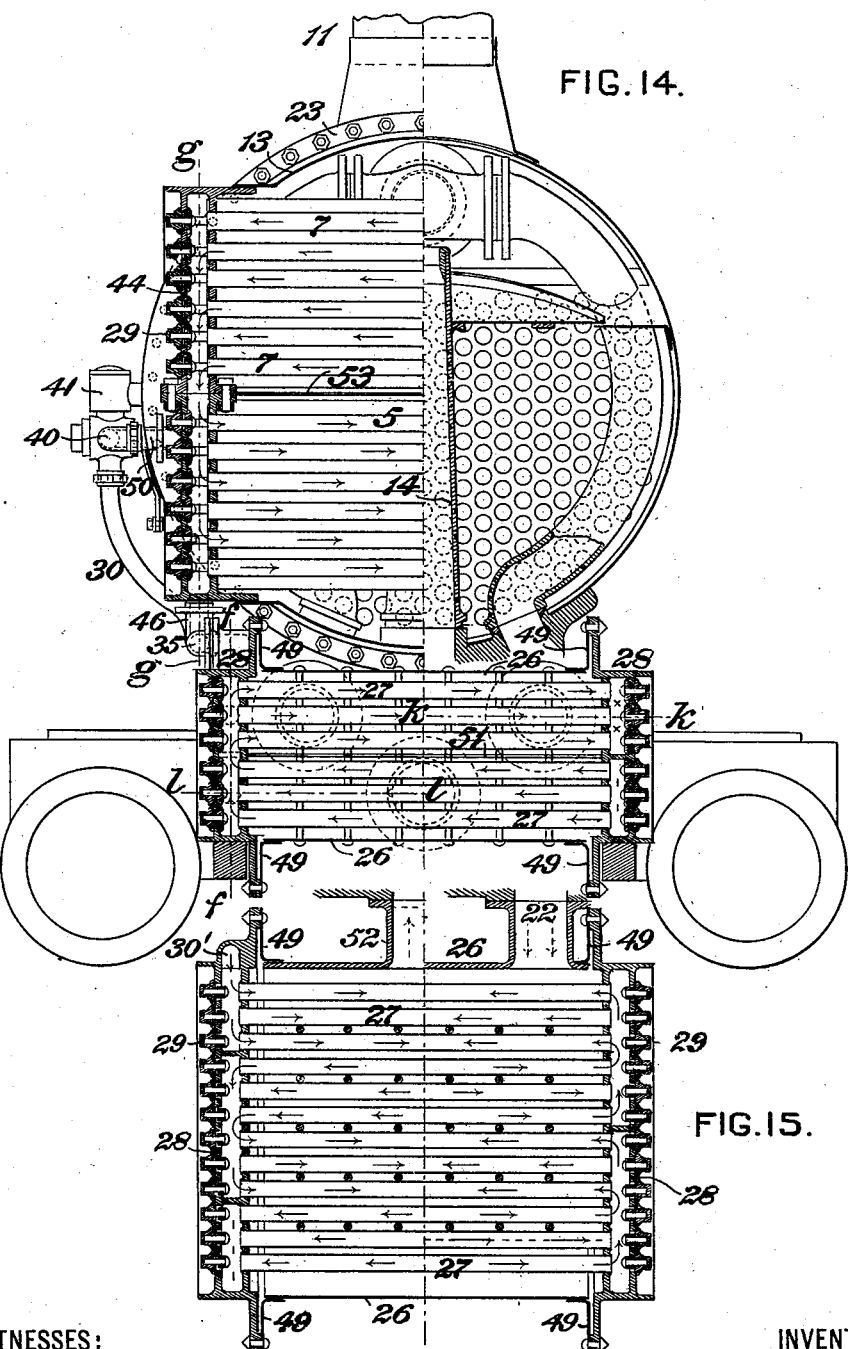
Figure 16:
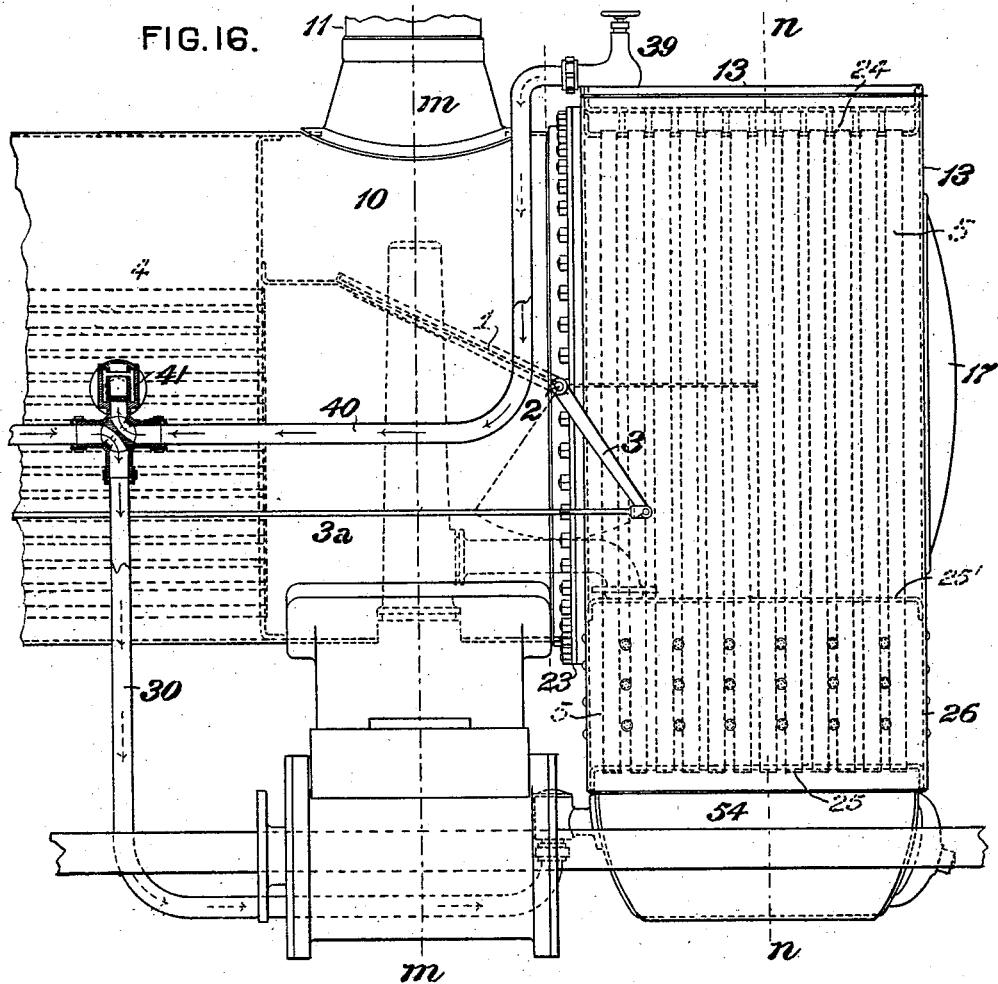
Figure 17:
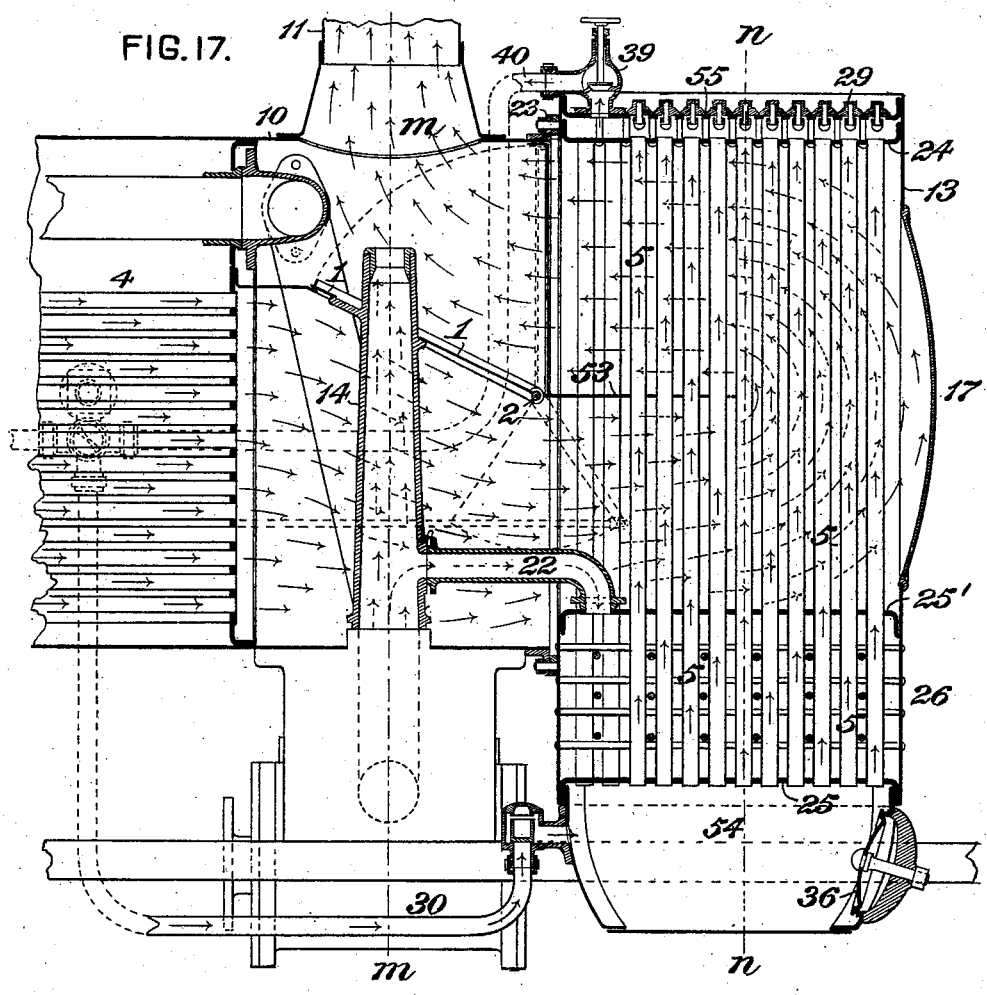
Figures 18, 19:
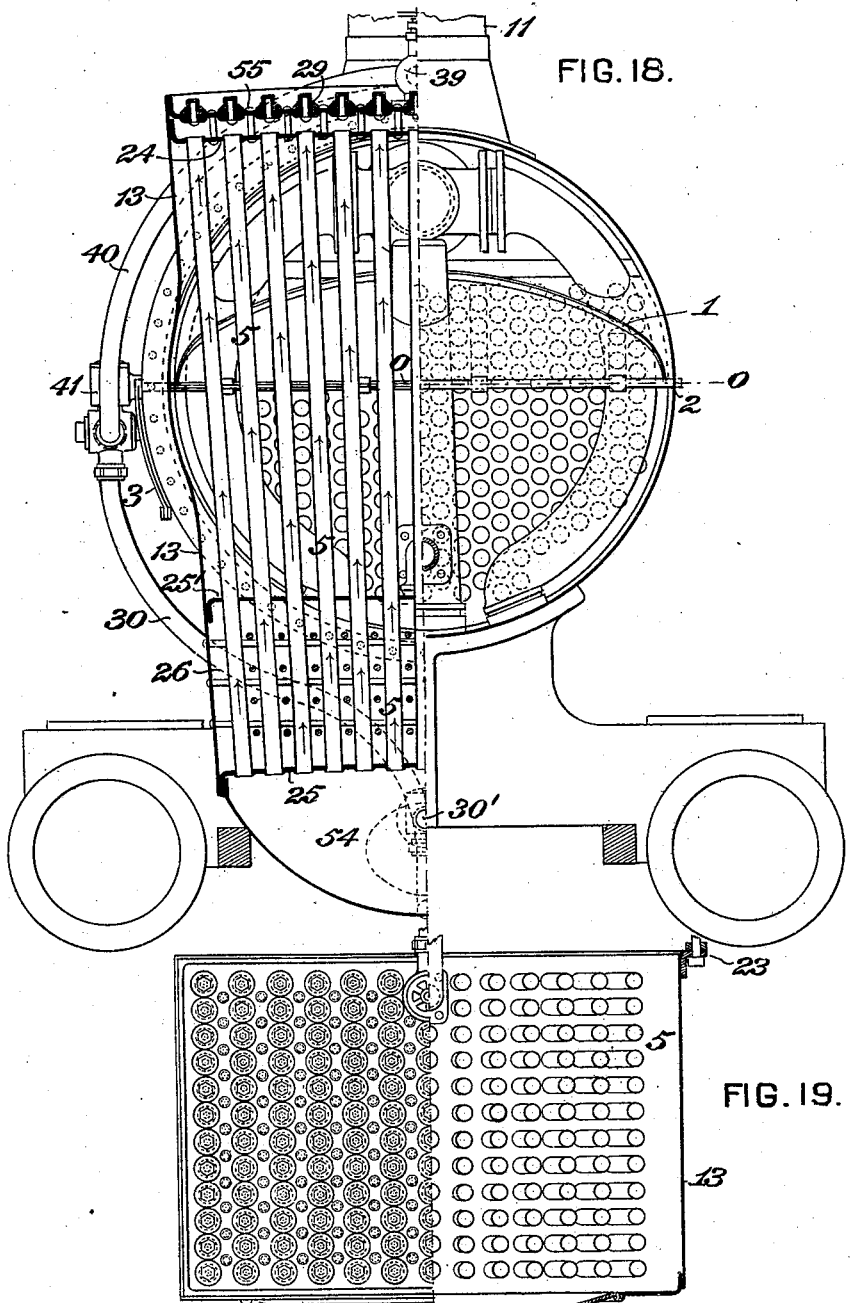
Figure 20:
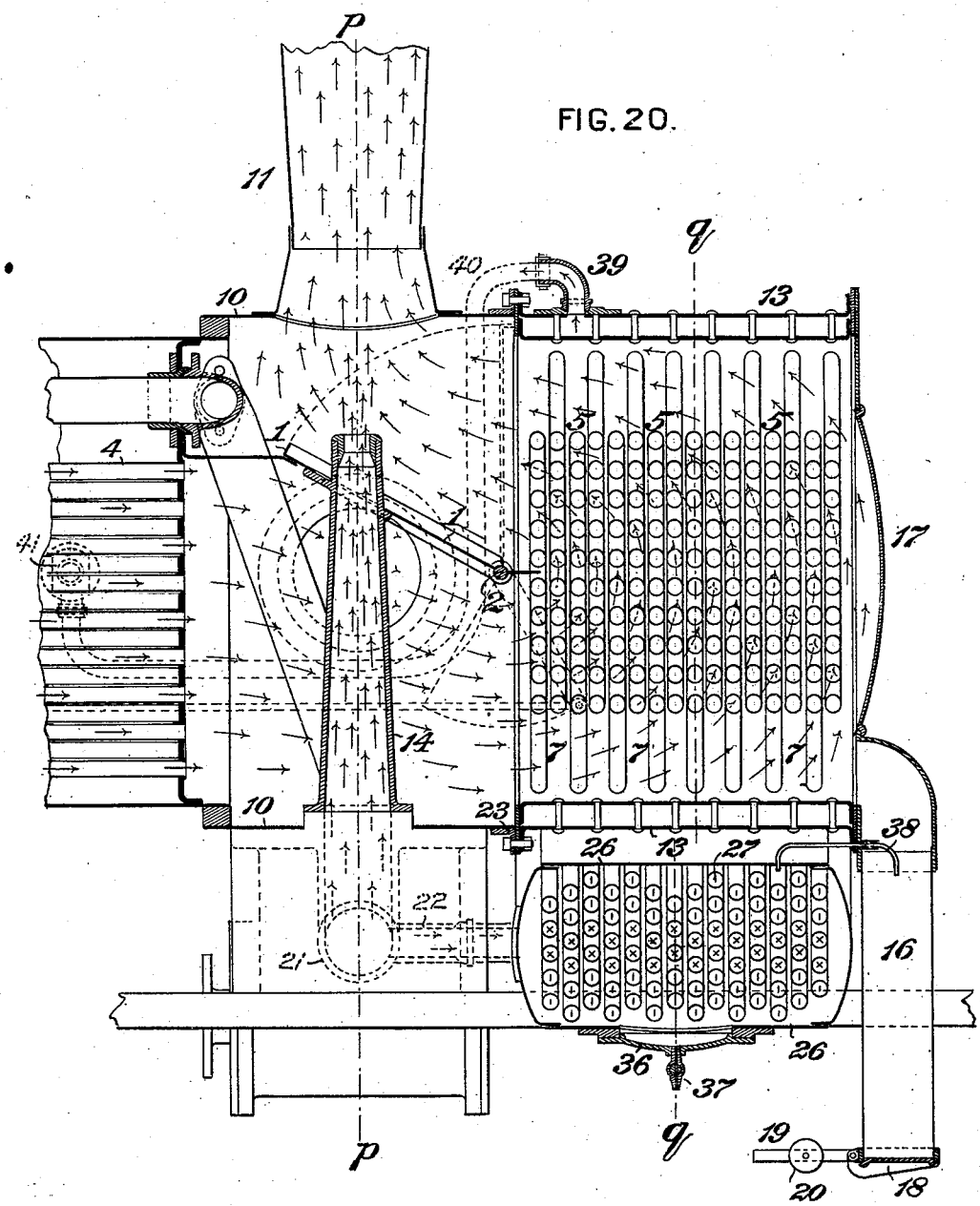
Figure 24:
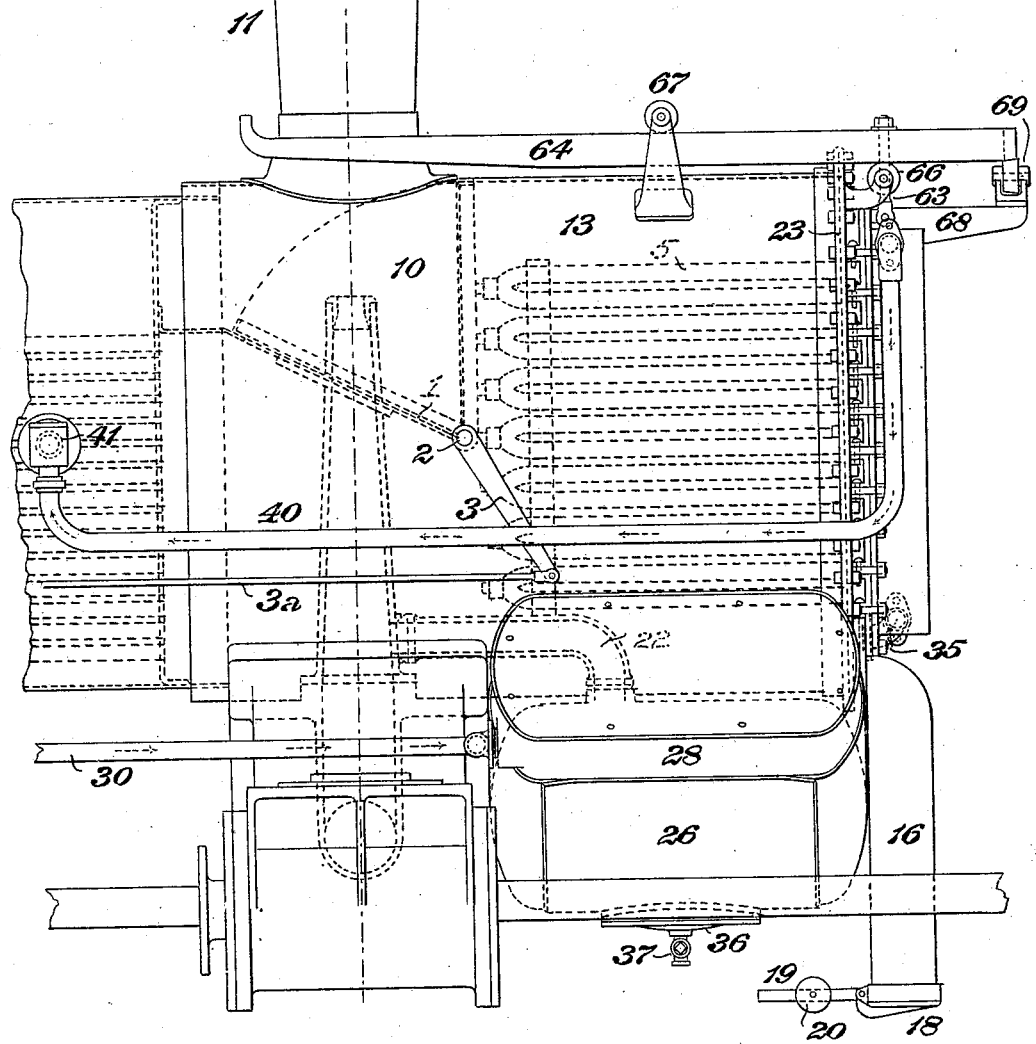

In the accompanying drawings, Fig. 1 is a side view of the front end of a locomotive-boiler, showing the smoke-box and the front part of the boiler-shell which incloses the boiler-tubes and illustrating one form of my invention. Fig. 2 is a longitudinal central section through the same; Fig. 3, a vertical transverse section looking forward, the right-hand half being taken on the line $a\,a$ and the left-hand half on the line $b\,b$ of Figs. 1 and 2; Fig. 4, a half end view of the exhaust-heater with the cover removed looking in the direction of the dart $c$; Fig. 5, a half-sectional view of the other end of this heater, taken on the line $e\,e$ and looking in the direction of the dart $d$; Figs. 6 and 7, sectional and plan views, respectively, on an enlarged scale, of the covering-plates and their fastenings at the ends of the tubes. Fig. 8 is a view in side elevation of the front end of a locomotive-boiler, showing steam and exhaust heaters, each of which has straight transverse water-tubes disposed somewhat differently from those in the preceding figures; Fig. 9, a vertical section of the end of the exhaust-heater, taken on the line $f\!f$ of Fig. 14; Fig. 10, a similar section of the fire-heater drawn on the line $g\,g$ of Fig. 14; Fig. 11, a longitudinal central section through the front end of the boiler and the heaters; Fig. 12, a section, and Fig. 13 a plan, of one of the tube-covering plates and their fastenings drawn on an enlarged scale; Fig. 14, a vertical transverse section through the smoke-box and heaters of Figs. 8 to 13, inclusive, looking backward, the upper right-hand side representing a transverse section of the smoke-box drawn on the line $h\,h$ of Figs. 8 and 11, the upper left-hand side being a section of the fire-heater drawn in the line $i\,i$ of Figs. 8 and 11, and the lower part of this figure being a section representing the whole of the exhaust-heater; Fig. 15, a sectional plan of the exhaust-heater, the right-hand half drawn on the line $k\,k$ and the left-hand half on the line $l\,l$ of Fig. 14. Figs. 16 to 19 illustrate a form of heater in which tubes are arranged vertically and in which the same tubes form both the exhaust and the fire heaters. Fig. 16 is an external side view; Fig. 17, a longitudinal central section; Fig. 18, a vertical transverse section looking backward, the right-hand half being taken on the line $m\,m$ of Figs. 16 and 17 and the left-hand side on the line $n\,n$ of the same figures; Fig. 19, a sectional plan view, the right-hand half being in section on the line $o\,o$ of Fig. 18 and the left-hand half a plan view, looking down on the top of the fire-heater, with the outside top cover removed. Figs. 20 to 23 illustrate a fire-heater having its tubes placed diagonally and an exhaust-heater having curved tubes similar to those shown in Figs. 1 to 5. Fig. 20 is a longitudinal central section, and Fig. 21 a vertical transverse section, through both heaters, the right-hand half of Fig. 21 being taken on the line $p\,p$ and the left-hand half on the line $q\,q$ of Fig. 20 looking forward; Fig. 22, a half end view with the outside cover removed, and Fig. 23 a half-section on the line $r\,r$ of Fig. 21 looking at the ends of the heating-tubes. Fig. 24 is a side elevation, and Fig. 25 a longitudinal section, of the smoke-box and adjacent parts of a locomotive-boiler, showing a fire-heater having horizontal longitudinal water-tubes and an exhaust-heater having curved transverse tubes; Fig. 26, a plan view of the crane from which the fire-heater is suspended and by which it is removable from the smoke-box; Fig. 27, a vertical transverse section, the right-hand half being taken on the line $s\,s$ and the left-hand half on the line $t\,t$ of Fig. 25 looking forward; Fig. 28, a half-section on the line $v\,v$ of Fig. 27 looking at the ends of the heating-tubes of the exhaust-heater in the direction of the dart $w$; Figs.

Figures 29, 30:
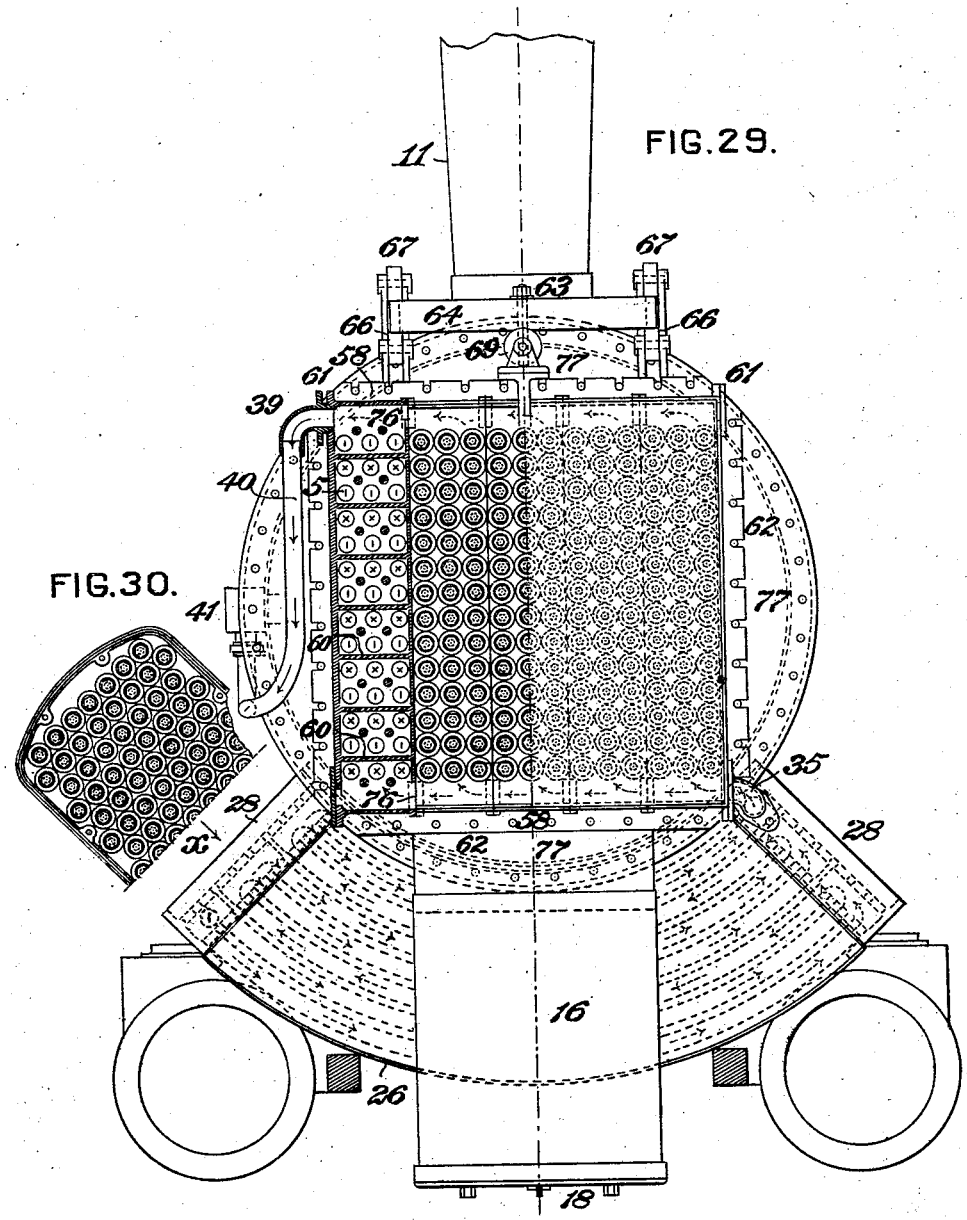

28$^a$ and 28$^c$, sectional views of U-bends of the heater-tubes; Figs. 28$^b$ and 28$^d$, end views of the U-bends shown in Figs. 28$^a$ and 28$^c$, respectively; Fig. 29, a front end view of the smoke-box and heaters looking backward, the left half showing the cover over the ends of the fire-heating tubes removed and the header 58, to which the heating-tubes are attached, being shown in section; and Fig. 30, an end view of one-half of the exhaust-heater looking in the direction of the dart $x$ and with the outside cover removed.

The main object of my invention is, as before stated, to utilize a portion of the heat which is carried away by the exhaust-steam and also a part of that contained in the waste gases of combustion to heat the feed-water or the steam. The appliances herein described are also adapted for superheating or reheating steam.

In feed-water heaters which have heretofore been essayed on locomotives the following difficulties have been encountered: First, there has been insufficient heating-surface, so that the water was only slightly heated; second, the tubes or other receptacles which contained the feed-water have been quickly clogged with solid deposits from the water, which could not be readily removed from them; third, there was an inadequate provision for the expansion and contraction of the tubes, which caused leakage and was destructive to the apparatus, and, fourth, the various parts were more or less inaccessible, and therefore difficult to repair or renew. By my present invention, as already stated, the water is heated in two successive stages—first by the exhaust-steam and next by the waste gases of combustion—as described in Letters Patent No. 632,708, granted and issued to me under date of September 12, 1899.

In order to provide an ample amount of heating-surface, the exhaust-heater is placed below the front end of the extended smoke-box and the fire-heater is located inside the latter. As the boilers of locomotives are now usually located at a considerable height above the frames, with the method of construction here described there is usually sufficient room below the extended smoke-box and above the frames for an exhaust-heater of ample dimensions. Wherever impure water is used, its solid constituents will be rapidly deposited in receptacles in which it is heated. Therefore in all the structural forms of the invention herein set forth, excepting one of them, the water is contained in the inside of tubes and the heating mediums—that is, the exhaust-steam and waste gases—are applied to the outside. These tubes are then all so disposed that their insides are accessible from their ends and from the outside of the locomotive, and thus any accumulated mud or deposit can readily be removed. The ends of the tubes can also be calked from the outside if they should leak, or any tube can be removed and replaced by a new one, if it is required to do so, without disturbing any other part. Several different means are employed to provide for the expansion and contraction of the tubes, which with the construction devised for making the different parts readily accessible for cleaning and repairs will be hereinafter explained. As it may also be desirable at times to apply the full force of the blast to stimulate the fire and permit the products of combustion to flow directly from the boiler-tubes to the chimney without circulating in contact with the surfaces of the tubes of the fire-heater, a door or valve is provided inside of the smoke-box, which when raised up into a vertical position allows the smoke and gases from the boiler-tubes to flow directly upward and out of the chimney. When the door is lowered, the smoke-box is divided into an upper and a lower chamber, and the course of the gases is intercepted and they are directed and made to flow from the lower part of the smoke-box through or around the tubes which provide the heating-surfaces of the fire-heater and thence into the upper part of the smoke-box to the chimney. Suitable means are provided for opening and closing this door from the cab of the locomotive. One of the effects of the circulation of the products of combustion in contact with the surfaces of the heater, which will be comparatively cool, is that the incandescent sparks and cinders will be extinguished and their movement being arrested by such contact they will fall and be deposited in the lower part of the smoke-box. In view of this I have provided a receptacle into which they will be carried by the action of the draft and in which they will be retained while the locomotive is working steam. A door having a counterweight is provided at the bottom of the receptacle. When the receptacle is empty, this door is closed by the weight, and when the locomotive is working steam a pressure is exerted on the under side of the door by reason of the partial vacuum produced by the steam-blast in the smoke-box, and the door is thus kept closed so long as the locomotive is working steam; but as soon as this is shut off and there is no longer a partial vacuum in the smoke-box nor any atmospheric pressure on the under side of the door the weight of the accumulated sparks or cinders will overcome that of the counterweight and the door will open and the sparks will fall out. As soon as this has occurred and there is no longer any weight above the door the counterweight will close the door and the process may be repeated. As it seems possible that the heating-tubes in the smoke-box may become coated with soot and require cleaning, to facilitate cleaning, and also to give access to the smoke-box for repairs, a form of fire-heater, Figs. 24 to 28, inclusive, is provided which is readily removable from the smoke-box by means of a species of crane which supports the heater when it is detached from the smoke-box and by which it can be removed therefrom and replaced therein, thus permitting the heating-tubes to be readily cleaned and giving full access to them and to the smoke-box for making repairs.

To accomplish the ends above described, various dispositions of systems of heating-tubes are provided, all embodying the essential and characteristic features of my invention. As explained, those for the fire-heater are placed inside of the extended smoke-box and those for the exhaust-heater below such extension, and all are located ahead of the cylinders, exhaust-pipes, and chimney, although this is not an essential feature of the invention, and are disposed in a variety of ways, as shown by the drawings.

Figs. 1 to 3, inclusive, represent the fire-heater as provided with horizontal longitudinal tubes 5 5 and 7 7, which are surrounded with water and through which the products of combustion pass. The exhaust-heater 26 26 is located below the fire-heater and consists of a system of curved tubes 27 27' 27'', Fig. 3, inclosed in a shell 26 26, the form of which is shown in section in Figs. 2 and 3.

The exhaust-heater (shown in Figs. 1 to 5, inclusive) is connected to the exhaust-passages 21 of the locomotive by two pipes 22 22, which allow the exhaust-steam to flow from the former directly into the heater, where it comes in contact with the heating-tubes 27 27' 27''. The feed-water is delivered into the exhaust-heater by a pipe 30, Figs. 1 and 3. The direction of the flow of water into and through this heater is indicated by the arrows in Figs. 1, 3, and 5. The water from the exhaust-heater is delivered into the fire-heater through the opening 35, Fig. 3. In Figs. 8 to 15, inclusive, both the exhaust and fire heater are shown as having straight horizontal transverse tubes with the water inside of them, and the exhaust-steam and products of combustion circulate about the outside of them. In Figs. 16 to 18, inclusive, vertical water-tubes are shown, which extend through and are common to both the exhaust and fire heaters. As shown in Figs. 20 and 21, the exhaust-heater has curved tubes similar to those in Figs. 1 to 3, and the fire-heater has diagonal intersecting water-tubes, and in Figs. 24 to 29, inclusive, the exhaust-heater also has curved tubes similar to those shown in Figs. 1 to 3 and 20 and 21. The fire-heater (shown in Figs. 24 to 29, inclusive) has horizontal longitudinal water-tubes which are connected to cast-iron headers at the front of the extension of the smoke-box and form a "coil" through which the feed-water flows. As before stated, a species of crane (shown clearly in Figs. 25 and 26) is provided on top of the extension of the smoke-box. By means of this crane this system of pipes can be removed from and replaced in the smoke-box. In all these examples the system of fire-heater tubes is placed ahead of the ordinary smoke-box 10, and a door 1, which is attached to a horizontal shaft 2, is provided. The shaft extends through the sides of the smoke-box and has an arm 3 on the outside. A rod $3^a$ connects this with the cab of the locomotive, and the door can thus be opened and closed by the engineer at any time. When it is closed down in the position in which it is represented in the different figures, the smoke and gases from the boiler-tubes are made to circulate through or around the heating-tubes of the fire-heater, as shown by the arrows in Figs. 2, 11, 17, 20, and 25, before escaping out of the chimney. When the door is raised up into the position represented by the dotted lines in these figures, the smoke and gases can pass directly from the boiler-tubes to and out of the chimney. This feature is common to all of the plans shown in the drawings, although the location and disposition of heating-tubes varies in the different plans. The exhaust-heaters in all of them consist of a vessel or receptacle for the exhaust-steam which is traversed by a system of heating-tubes through which the feed-water circulates. These heaters in the examples shown are located below the extended smoke-box and the fire-heater; but other locations for them are available. All the heating-tubes which contain feed-water are provided with covering-plates opposite their ends. These plates are removable from the outside of the locomotive. They give access to the inside of the tubes, which can thus be reached for cleaning, repair, removal, and replacement.

The different forms of heaters herein proposed will now be more fully explained.

In Figs. 1 to 7, inclusive, a fire-heater is represented, which consists of a cylindrical shell 13, whose outside surface is coincident with the form of and is attached to the front end of the smoke-box 10 by angle-iron flanges 23 and bolts. Two tube plates or heads 24 25, Fig. 2, extend across and are secured to the shell 13 at or near its ends, and the whole of the interior space of the heater is occupied by heating-tubes 5 5 7 7, which are placed the same distance apart as the boiler-tubes 4 4, but the heater-tubes are of larger diameter than the boiler-tubes. The space around the heater-tubes is filled with the feed-water. The exhaust-heater in this plan consists of a vessel 26, the transverse section of which is shaped to conform to the outer contour of the smoke-box, as shown in Fig. 3, and also to be adapted to receive the bent tubes which it contains. This form of heater allows a larger number of tubes to be used in the available space which can be occupied by the heater than any other form would, and the bent form of the tubes permits them to expand and contract independently of the vessel in which they are inclosed. This heater is closed at its ends by cast-iron headers 28. The headers are formed of two plates, with an interposed water-space, and the tubes are attached to the inner plates. The outer plates are provided with hand-holes closed by covers 29 opposite the ends of the tubes. The hand-hole covers are shown on an enlarged scale in Figs. 6 and 7. Each of them is fastened in its position by a clamp 31, Fig. 6, which engages with the inside of the plate to which the hand-hole cover is attached and is held by a bolt 31ᵃ, (clearly shown in the drawings,) which screws into the hand-hole cover 29. The latter has a ground surface where it is in contact with the plate to which it is fastened. By simply unscrewing the plate from its bolt it can be removed, and access may then be had to the inside of the tube opposite to it. There is a space of a few inches wide between the plates, through which the feed-water circulates. This is conveyed from the boiler-feeder through a pipe 30. (Shown in Figs. 1, 3, and 5.) From this pipe the water enters a passage-way 30', Fig. 5, and flows downward, as indicated by the arrows, into a space 30'' between the two plates of the adjacent header 28. The space between the two plates of each of the headers is divided by a partition 32, Fig. 5, which causes the water to circulate first through the lower series of tubes 27, as shown by the arrows in Fig. 3. It flows through these tubes in the direction of the arrows shown on the left side of Fig. 3 into the chamber 33 of the header 28 at the opposite end of the heater. In this the current of water is reversed, and it flows back through the tubes 27', as indicated by the arrows, to the header 28 at the opposite end of the heater, adjacent to the pipe 30, in which header the current is again reversed and passes through the tubes 27'' to the chamber 34 of the header at the opposite end, from which it passes into the fire-heater through the passage 35. Exhaust-steam is conveyed from the exhaust-passages 21 by pipes 22, which connect the former with the exhaust-heater 26. The latter is provided with a manhole and cover 36 on its under side to give access to its interior. A cock or valve 37 is attached to the cover to allow the condensed water of the exhaust-steam to escape. If the heater was filled with air, it might to a very great extent prevent the exhaust-steam from entering or coming in contact with the heating-tubes. For this reason a pipe 38 (see Fig. 2) is provided to allow the air in the heater to escape. This pipe is connected with the receptacle 16 for sparks. After all the air in the heater has been discharged exhaust-steam will escape from this pipe into the receptacle for sparks, the effect of which will be to extinguish them. It will be seen from Fig. 2 that when the door 1 is in the position in which it is shown in full lines the upper part of the smoke-box 10 and the chimney 11 are separated from the lower part of the smoke-box and that the smoke and gases which pass through the boiler-tubes 4 must then take the course indicated by the darts—that is, they must pass forward through the lower series of heating-tubes 5 of the fire-heater into the supplementary smoke-box 6. As the effect of the blast is to produce a partial vacuum in the upper part of the smoke-box, the contents of the supplementary smoke-box 6 will be drawn backward into the upper part of the main smoke-box 10, through the upper tubes 7 of the heater, and will then be carried upward and out of the chimney 11, as indicated by the arrows. As it is essential that there should be sufficient sectional area in the tubes of the heater to permit the products of combustion to pass through them freely and as in a heater of this kind all the smoke and gases which pass through the boiler-tubes must pass through one half of the heater-tubes and return through the other half, it is essential to provide as many of them and make them of as large a size as possible. As no steam will be generated in the heater, there need not be any room provided in it for steam, nor is it requisite to make any provision for the escape of steam from the tubes. Therefore the whole of the cylindrical portion or shell 13 of the heater is filled with tubes and with water. The centers of the tubes are placed directly opposite those of the boiler-tubes 4, and in order to make it possible to remove any of the latter without disturbance to the heater the heater-tubes are made of sufficient internal diameter, so that the boiler-tubes will pass through them, and the latter can thus be removed through the former and new ones substituted. The heater-tubes being of enlarged diameter have each a greater sectional area than the boiler-tubes, and although there will be less free water-space between them if the tubes are enlarged this is not of much importance in a heater, because no steam is generated in it, and therefore, as has been explained, it is not requisite to provide room or means for its escape from the heating-surfaces. By making the tubes in the heater larger than the boiler-tubes and spacing both the same distance apart and making the diameter of the heater somewhat larger than that of the boiler, so that the total number of tubes in it can be increased, the internal sectional area of one-half of the heater-tubes will be nearly or quite as large as that of all the boiler-tubes. As the smoke and gases pass first through the lower series of heater-tubes and then return through the upper ones, the products of combustion have a double "run" through the heater-tubes, and thus the period of contact of the escaping smoke and gases with the heater-tubes is doubled, which facilitates the transmission of the heat that they contain to the water by which they are surrounded. When the feed-water is delivered into the exhaust-heater, as described, it will be heated to a temperature approximating to that of the exhaust-steam, which is about 240°. It will then come in contact with the heating-surfaces in the fire-heater, which are exposed to the waste products of combustion that escape from the boiler-tubes. The temperature of these varies between wide limits; but experiments have shown that they are sometimes as high as 1,200°. Consequently if the feed-water after being heated by exhaust-steam to a temperature somewhat below 240° (that of the exhaust-steam) is then brought in contact with surfaces heated by the waste gases of combustion another very considerable increment of heat will be absorbed by the water, provided there is enough heating-surface, so that the water will be in contact with it a sufficiently long time. By the construction herein described a large amount of heating-surface is provided in the fire-heater. The water is then admitted to or near its lower portion and escapes through the nozzle 39 at its top and is conducted by a pipe 40 to the check-valve 41, Figs. 1 and 2, and thence to the boiler. The fire-heater is therefore entirely filled with water, which is in contact with its heating-surfaces for a period of time equal to that required for the consumption of a volume of water in the boiler equal to the contents of the heater. When the smoke and gases which pass through the boiler-tubes 4 enter the smoke-box 10, the upper current comes in contact with the under side of the door 1, which thus acts as a deflector and has the effect of directing the sparks and cinders downward, and when the products of combustion enter the smoke-box its enlarged and free space permits them to become partially quiescent, which allows some of the sparks and cinders to fall and be deposited at the bottom. To facilitate their escape therefrom, a large tube 15, Figs. 2 and 3, is provided in the lower part of the heater, into and through which the sparks and cinders will be carried by the draft. At the bottom of the supplementary smoke-box 6 I provide a spark-receptacle 16, into which the sparks will be carried from the tube 15. It will also occur that in passing through the lower series of tubes the sparks and cinders which are carried through the boiler-tubes will come in contact with the internal surfaces of the heater-tubes. These, being surrounded with comparatively cold water, are of a correspondingly-low temperature. The effect of the contact of the incandescent sparks with these cold surfaces will be, as has been explained, to extinguish them, and as the direction of the movement of the smoke and gases is changed when they reach the supplementary smoke-box 6 and these are then turned upward the sparks and cinders will be projected against the front 17 and their movement will thus be partially arrested and they will then be likely to fall to the bottom and into the receptacle 16. This construction thus acts as an efficient spark-arrester. As the receptacle 16 would soon be filled with sparks, it is essential to remove them from time to time. To do this and exclude air from the smoke-box while the locomotive is at work, I provide a door 18 at the bottom of the spark-receptacle. This is hinged on one side and opens downward, as indicated by the dotted lines, and it is fitted to its bearings so as to be as near air-tight as is practicable. The door is provided with an arm 19 and a counterweight 20, sufficiently heavy to close the door and keep it closed when the receptacle 16 is empty. When the locomotive is working with steam, a partial vacuum is formed in the smoke-box, which causes the external air to exert a pressure on the under side of the door 18, which will keep it closed, even though the space above it is partially or entirely filled with cinders. As soon as steam is shut off, however, and there is no longer a partial vacuum in the smoke-box and no pressure on the under side of the door the weight of the cinders above, if the receptacle 16 is even partially filled, will be sufficient to overcome the gravity of the counterweight, and the door will open and discharge the cinders which are above it. As soon as they have escaped the action of the counterweight will close the door again, and it will be kept closed until there is another deposit of cinders in the receptacle 16 and steam is again shut off. The fire-heater 13 is attached to the smoke-box by angles or flanges 23 and bolts, so that it can readily be detached, either to repair it or to afford access to the inside of the smoke-box. In order to be able to get into the smoke-box, however, without taking down the heater, manholes covered by plates 42, Fig. 1, are provided on each side of it. Similar manholes 43, closed by covers, are also provided in each side of the heater to give access to its inside.

In Figs. 8 to 15, inclusive, the exhaust-heater, as in the preceding figures, is located below the fire-heater; but it has straight instead of curved tubes. These are disposed in groups and the water is made to flow through the groups successively in a manner similar to that exemplified in the exhaust-heater shown in Figs. 1 to 3, inclusive. The water enters by the feed-pipe 30 to the chamber 30' (shown clearly in the section of the header, Fig. 9) and then flows through the first group of nine tubes and back through the second group, as indicated by the marks $x$ and $l$ in the figure referred to, and so on successively through the eight groups, as indicated by the arrows in Figs. 14 and 15, until it reaches the passage 35, Figs. 8 and 9, from which it is conveyed by the pipe 46 to the fire-heater above, as shown in Figs. 8 and 14. In order to provide for difference in expansion between the tubes of the heater and its case or shell 26, it is connected to the headers 28, Figs. 14 and 15, by means of plates 49, having a certain degree of flexibility. These are riveted to the shell 26 of the heater and to the headers, and they can spring more or less if there should be any difference of expansion between the tubes and the shell. The heater is connected with the exhaust-passages of the cylinders by pipes 22. The steam when it escapes from the cylinders passes through these pipes into the exhaust-heater 26, which is divided horizontally by a plate 51, Figs. 11 and 14, which separates the upper part of the heater from the lower. The steam when it enters the heater flows forward, as indicated by the dotted arrows in Fig. 11, and then downward and backward, below the plate 51 to the pipe 52, and thence to the exhaust-pipe 14 and to the chimney 11. All the exhaust steam from the cylinders must thus flow through the exhaust heater in its passage from the cylinders to the chimney.

It has been explained that the fire-heater shown in Figs. 8 to 15, inclusive, is composed of horizontal water-tubes 5 and 7, which are connected at their ends to cast-iron headers 44. (Shown in the transverse section, Fig. 14, and in vertical longitudinal section in Fig. 10.) These are made in two parts and are bolted together through flanges 45, as shown. These headers are provided with partitions, (shown by the sinuous full and dotted lines in Fig. 10,) which divide the spaces between the inner and the outer plates of the headers into separate sections, to each one of which a group of heating-tubes is connected. The feed-water from the exhaust-heater is conducted to the upper or fire heater through the nozzle 35 and pipe 46 and the passage-way 47, Fig. 10, to the space or section 48 in one of the headers 44. The water, in a receding flow, then passes through the group of tubes connected with this section, as indicated by the marks $x$, and then returns through the next group on the right, as indicated in the drawings, and so on to the upper right-hand group of tubes, and then downward, as indicated by the arrows, to the lower series of tubes to the nozzle 50, through which it emerges and is conducted by the pipe 40, Fig. 8, to the check-valve 41 and into the boiler. The tubes of both the exhaust and fire heaters are accessible through hand-holes provided with covers opposite to each of their ends, as shown, the hand-hole covers being the same as those described in the heaters shown by Figs. 1 to 5, inclusive. These plates are clearly shown in Figs. 8, 12, 13, 14, and 15. The fire-heater shown in Fig. 11 is also provided with a door or valve 1 in the smoke-box to direct and control the flow of the waste gases, the construction and operation of which are the same as those already described. The space in the fire-heater occupied by the tubes 5 7 is partially divided by a horizontal baffle-plate 53, Fig. 11, which causes the waste gases to circulate among the whole of the lower series of heating-tubes and then upward and back through the upper series, as indicated by the arrows in Fig. 11. A spark-receptacle 16, similar to that before described, is also provided with this heater. A wire-netting 54, Fig. 11, can be provided to arrest sparks if it is found essential.

The heaters shown in Figs. 16 to 19, inclusive, consist of a system of straight vertical tubes 5 5, which are connected to tube-plates 24 and 25 inside of a casing 13, which is connected to the smoke-box 10 by flanges or angles 23 and bolts. At some distance above the lower tube-plate 25 another similar plate 25' is located. The space between this plate and the lower one forms the exhaust-heater and is connected to the exhaust-pipe 14 by a pipe 22, through which exhaust-steam can flow into the exhaust-heater when the locomotive is working steam. A feed-water receptacle 54 is located below the lower tube-plate 25. The feed-pipe 30, Figs. 16 and 17, connects the boiler-feeder with this receptacle, and the feed-water is delivered into it, as indicated by the dotted arrows in the pipe 30. When the receptacle 54 is full, the water rises and fills the heating-tubes, and their lower ends being surrounded by exhaust-steam some of its heat is imparted to the water. As is shown clearly by Fig. 17, this heater is also provided with a door 1, similar to that shown and described in the preceding drawings, and a baffle-plate 53 partially divides the heating-space of the fire-heater, so that when the door is closed down the smoke and waste gases from the boiler-tubes 4 must take the course indicated by the arrows in Fig. 17. In doing so they circulate around the upper portion of the tubes 5, and thus impart much of their heat to the water in them. That contained in their lower portions, which is exposed to the heat of the exhaust-steam, is gradually forced upward by the feed-water which enters the receptacle 54 below, and it thus flows into the upper portions of the tubes, which are exposed to the escaping gases. As their temperature is usually much higher than that of the exhaust-steam, another increment of heat is thus imparted to the water. The top of the heater is closed by an outer head 55, which is placed a few inches above the upper tube-plate 24. Hand-holes are formed in the outer head 55 directly opposite the tubes, through which they are inserted or removed and can be repaired or cleaned. The hand-holes are closed by hand-hole covers 29, similar to those hereinbefore described. As the water in the heater is gradually forced upward by the entering feed-water below, it flows into the space between the upper tube-plate 24 and the outer head 55. From this space it is conducted through the valve 39 by the pipe 40 to the check-valve 41 and thence to the boiler. The feed-water receptacle 54 is made sufficiently large to permit a man or boy to go inside of it to calk the tubes and do other repairs. To give access to it, a manhole, closed by a suitable cover 36, is provided.

Figs. 20 to 23, inclusive, show an exhaust-heater having curved tubes and similar in all respects to that shown in Figs. 1 to 5, inclusive, which has been before described. The fire-heater consists of a double series of inclined tubes 5 and 7, which are in intersecting positions to each other, as shown in Fig. 21. These are inclosed in a hexagonal-shaped shell or casing 13, which has double sides, consisting of inner tube-plates, to which the tubes are attached, and outer plates, located a few inches from the tube-plates, and with hand-holes opposite the ends of all the tubes.

The hand-holes are closed by hand-hole covers 29, such as have been before described. This heater is fastened to the smoke-box by angles or flanges 23 and bolts, so that it can readily be detached when it is requisite to do so. The door 1, as in the forms previously described, directs the draft through and among the tubes, as indicated by the arrows, and when raised up into the position shown by the dotted lines in Fig. 20 it permits the smoke and products of combustion to escape from the boiler-tubes directly to the chimney. The exhaust-heater 26 is connected to the exhaust-passages 21 by pipes 22. The flow of exhaust-steam into the heater is indicated by the arrows in the pipe 22 in Fig. 20. The cold water is fed into the exhaust-heater by the pipe 30, Fig. 21, from which the course of its circulation is indicated by the arrows until it finally enters the fire-heater through the pipe 35. It then has access to the spaces between the outer shell of the fire-heater and the inner plates and can thus flow into all the tubes, as indicated by the arrows in Fig. 21. The bottom and the top of the heater are also double, so that the water can flow from the pipe 35 across through the space between the inner and outer shells to the opposite side of the heater and to the tubes 7, which are connected to that side. A pipe 40, connected to a nozzle 39 at the top of the heater, conducts the heated water therefrom to the check-valve 41 and thence to the boiler. A spark-receptacle 16, similar to that before described, may be used with this form of heater.

Figs. 24 to 30 illustrate a fire-heater provided with longitudinal horizontal water-tubes so disposed that they can be removed from the smoke-box whenever it may be desirable to do so to clean or repair them. The exhaust-heater 26 has curved tubes, and being substantially similar to that shown in Figs. 1 to 5 and 20 and 21, inclusive, need not, therefore, be again described. The tubes 5 of the fire-heater are placed horizontally and set longitudinally in the extended smoke-box 13, to the front of which a plurality of cast-iron sectional headers 58 are bolted. These are made with double plates and a water-space between them and are of a width sufficient to take three or may be made to take any other number of rows of heating-tubes. The tubes are attached to the inner plates of the headers in pairs, as shown clearly in Fig. 25, and the adjoining back ends of each pair of tubes are connected together by a U connection 59. Between the two pipes of each pair a division 60 is formed in the headers. These divisions are shown in Fig. 25 and also in Fig. 29, in which one header 58 is represented in transverse section. The feed-water is conducted from the exhaust-heater to the fire-heater through the openings and pipe 35, Figs. 24, 25, and 29. The different headers have water-passages 76, Fig. 29, at their upper and lower ends, connecting those which adjoin each other. The water when it enters through the pipe 35 (see Fig. 29) can flow from one header to the other, as indicated by the dotted arrows on the left of 35, and into the lowermost of the tubes 5 (see Fig. 25) and backward through them to the U-bends 59, by which these tubes are connected to those next above them, and then forward through the second row of tubes to the next compartment in the header above the lowermost one. As indicated by the arrows in the figure, the water can then again flow backward through the third row of tubes from the bottom and forward through the fourth row to the header, and so on until it reaches the top row and the top of the headers. It then flows in the direction indicated by the dotted arrows in Figs. 27 and 29, above the top row of tubes, then out through the nozzle 39, and is conducted by the pipe 40 to the check-valve 41 (shown in Fig. 29) and thence to the boiler. Enlarged sectional and back end views of the U-bends are shown in Figs. $28^a$ to $28^d$, inclusive. In order to give access to the inside of these bends, plugs 70 are screwed into their back ends. By unscrewing these any scale or deposit which may accumulate in the bends may be removed. In order to support the back ends of the heating-tubes, every alternate U-bend has two vertical prongs 71. (Shown in Figs. $28^c$ and $28^d$ and also in the sectional view in Fig. 27.) When the tubes are in place, the lower U-bend rests on a bearing-bar 72, and the lower prong of the bend above it bears on the one below it, and so on, those above resting on those below. In this way the back ends of the whole system of heating-tubes are supported vertically by each other, the lower row being supported by the bearing-bar 72. To hold the tubes in place laterally, the alternate U-bends have prongs 73 (see Fig. 27) on their sides. These bear against the adjoining bends, and the two outer rows are held in place by vertical extensions 74 of the bottom bearing-bar. To hold the bends and tubes in place while the plugs are being screwed in or out, small lugs 75 (shown in Figs. $28^a$, $28^b$, and $28^d$) are provided, which engage with the prongs and resist any turning action exerted on the plugs. A door 1, similar to that before described, is also provided for this heater. The arrows in Fig. 25 show the direction of the currents which the smoke and gases must take in their passage from the boiler-tubes 4 to the chimney 11 when the door is closed down in the position in which it is shown. Opposite the front ends of each of the tubes 5 the outside plates of the headers have hand-holes, through which access may be had to the tubes for repairing or cleaning them. These hand-holes are covered by the same kind of plates as have already been described, any or all of which can be removed from the outside of the locomotive; but besides requiring cleaning internally the outside of the heating-tubes, which is exposed to the smoke and gases, may become coated with soot, which would interfere materially with their heating capacity. As it may be essential to clean them occasionally, the heater is constructed so that it can readily be removed from the smoke-box and placed in a position in which all its parts will be accessible. It may be explained, incidentally, that the headers for the tubes are made in separate sections and then bolted together in order to avoid the difficulty of getting entirely sound castings of such large dimensions and complex construction. In the drawings, Figs. 24 to 27, the headers are shown as made in five sections and bolted together by flanges at the top and bottom. When so united, they have a square contour, as shown in Fig. 29. On the outer edge of this contour square flanges 62 are provided. These flanges are bolted to the smoke-box front 77, to and from which they can readily be attached and detached. In order to be able to handle the heater conveniently, the headers and tubes connected to them are suspended by a bolt 63, attached to the top of the system of headers upon a species of crane 64, a partial plan of which is shown by Fig. 26. It consists of a stout bar of iron 64, bent into a U shape and provided with a cross-bar 65, from which the bolt 63 is suspended. The U-shaped bar is supported on two pulleys or rollers 66, on which it can be run longitudinally. Two more pulleys 67 are placed above the bar and some distance back of the pulleys 66. If the heater is suspended from this crane and then moved forward, its weight would tend to pull down the front end of the crane and tip up the back end. The pulleys 67 on top of the bar will resist this. It will also happen that as soon as the heater is clear of the smoke-box front the unbalanced weight of its tubes back of the bolt 63 would have the effect of tipping its back end downward. To resist this, a strong arm 68, Fig. 25, is attached to its middle header. This arm extends forward and has a conical wheel or pulley 69 in its front end. This wheel bears against the under side of the curved part of the bar 64 and resists the tendency of the heater to be tipped down. When the heater is moved forward so as to be clear of the smoke-box and is suspended from the bolt 63 as a center, the wheel or pulley 69 can roll in contact with the under side of the curved portion of the bar 64, and the whole heater can then be turned about the bolt into any desired position, and thus give free access to its tubes. The crane gives the same facilities for placing the heater in the smoke-box that it does for removing it. A spark-receptacle 16, similar to that before described, is also provided with this heater.

While the construction for heating the feed-water by exhaust-steam and that for heating by the waste products are here described as operating in connection one with the other, and while such a combination is considered advantageous, it is not essential that they should be combined, but either could be worked separately, and thus secure its own measure of economy. It is also to be noted that any of the fire-heaters herein described or a portion of any of them may be used for heating steam before it enters the cylinders or in its passage from one cylinder to another. By passing it through some or all of the heating-tubes part of the heat of the products of combustion would be communicated to the steam, which would thus be superheated. A portion of the tubes of any of the heaters may be used for this purpose and the others employed for heating water, or all might be used for heating steam. All that would be required in such case would be to provide suitable pipes and valves for conducting the steam to and from the heating-tubes.

I claim as my invention and desire to secure by Letters Patent—

1. The combination of a steam-boiler, a multitubular fire feed-water heater, a smoke-box located between, and connected at its opposite ends to, the boiler and heater, a chimney connected to the smoke-box, a partition or diaphragm in the smoke-box, by which the products of combustion from the boiler are intercepted and conducted intermediately through or around the heater-tubes in passing from the boiler to the chimney, means for supplying feed-water to the heater, and means for conveying it from the heater to the boiler.

2. The combination of a steam-boiler, a multitubular fire feed-water heater, a smoke-box located between, and connected at its opposite ends to, the boiler and heater, a chimney connected to the smoke-box, a partition or diaphragm in the smoke-box, an opening in said partition provided with a door, which, when open, permits the smoke and gases to escape directly from the boiler to the chimney, and, when closed, intercepts their flow and conducts them through or around the heater-tubes, means for opening and closing said door from the exterior of the smoke-box, means for supplying feed-water to the heater, and means for conveying it from the heater to the boiler.

3. The combination of a steam-boiler, a multitubular fire feed-water heater, a smoke-box located between, and connected at its opposite ends to, the boiler and heater, a chimney connected to the smoke-box, a partition or diaphragm in the smoke-box, an opening in said partition provided with a door which, when open, permits the smoke and gases to escape directly from the boiler to the chimney, and, when closed, intercepts their flow and conducts them through or around the heater-tubes, a receptacle for sparks and cinders, communicating with the passage for smoke and gas from the boiler to the chimney, means for supplying feed-water to the heater, and means for conveying it from the heater to the boiler.

4. The combination of a steam-boiler, a multitubular fire feed-water heater, a smoke-box located between, and connected at its opposite ends to, the boiler and heater, a chimney connected to the smoke-box, a partition or diaphragm in the smoke-box, a receptacle for sparks and cinders communicating with the passage for smoke and gas from the boiler to the chimney, a door closing a lower opening in said receptacle, a counterweight connected to said door, means for supplying feed-water to the heater, and means for conveying it from the heater to the boiler.

5. The combination of a steam-boiler, a multitubular exhaust feed-water heater, disintegral from the boiler or smoke-box and consisting of an exhaust-steam heating-chamber with headers at each end and having double plates with water-space between them, a system of heating-tubes in said chamber, connected by their ends to the inner plates of the headers, covered openings opposite to the ends of the tubes, giving access to them, means for conveying exhaust-steam to the heater, means for supplying it with feed-water and for conducting the water to the boiler, and a cock or valve for discharging water of condensation from the heater.

6. The combination of a steam-boiler, a smoke-box, a multitubular fire feed-water heater, a partition or diaphragm in the smoke-box, adapted to conduct the smoke and waste gases through or around the heating-tubes, a multitubular exhaust feed-water heater, disintegral from the boiler or smoke-box and consisting of an exhaust-steam heating-chamber with headers at each end, which have double plates with water-spaces between them, a system of heating-tubes in said chamber, connected by their ends to the inner plates of the headers, covered openings opposite to the ends of the tubes, giving access to them, means for allowing a difference of expansion or contraction of the tubes and the heating-chamber, means for conveying exhaust-steam to the heater, means for supplying it with feed-water, a duct for conveying feed-water from the exhaust-heater to the boiler or fire-heater, a pipe for conveying the feed-water from the fire-heater to the boiler, and a cock or valve for discharging water of condensation from the exhaust-heater.

7. The combination of a steam-boiler, a smoke-box, a multitubular fire feed-water heater, a partition or diaphragm in said smoke-box adapted to conduct the smoke and waste gases to the heater, an exhaust multitubular feed-water heater located outside of the smoke-box, means for conveying exhaust-steam and supplying feed-water to said heater, a blow-off cock or valve for the escape of condensed water therefrom, a duct for the passage of feed-water from the exhaust-heater to the fire-heater, a pipe for conducting feed-water from the fire-heater to the boiler, and a receptacle, connected with the smoke-passages of the fire-heater, and adapted for the collection of sparks and cinders and means for emptying said receptacle.

8. A fire feed-water heater inclosed in the smoke-box or uptake of a steam-boiler and consisting of a series of heating-tubes connected together in pairs at one end and to multilocular headers at the other, the separate tubes of each pair being connected to adjoining cells in the headers, openings and covers in said headers opposite the ends of the heating-tubes, means for supplying feed-water to said headers, and means for conducting it from the heater to the boiler.

9. A fire feed-water heater inclosed in the smoke-box or uptake of a steam-boiler and removable therefrom, consisting of a series of heating-tubes connected together in pairs at one end and to multilocular headers at the other, which form part of the smoke-box front, the ends of the said tubes connected thereto being accessible from the outside of the smoke-box by means of covered openings opposite the ends of the tubes, means for removing the heater from the smoke-box, and means for supplying feed-water to the heater and conveying it therefrom to the boiler.

10. The combination of a steam-boiler, a smoke-box, a diaphragm in said smoke-box, a feed-water heater consisting of a series of water-tubes inclosed in said smoke-box, and connected together in pairs at one end and at the other to multilocular headers at the front of the smoke-box, and provided with openings and covers opposite the ends of the tubes, means for supplying feed-water to said heater and for conveying the water to the boiler, and a receptacle for sparks and cinders, located below the heater and communicating with the passage-way for the smoke and gases in the smoke-box.

11. The combination of a steam-boiler, a smoke-box, a diaphragm in said smoke-box, a multitubular feed-water heater inclosed in the smoke-box, and removable therefrom, and a crane for supporting said heater in taking it from and returning it to the smoke-box.

12. The combination of a steam-boiler, a smoke-box, a diaphragm in said smoke-box, a multitubular feed-water heater inclosed in the smoke-box and removable therefrom, a crane consisting of a U-shaped bar supported on rollers, and a pivotal support for sustaining the heater, and on which it may be turned in taking it from and returning it to the smoke-box.

13. The combination of a steam-boiler, a smoke-box, a diaphragm in said smoke-box, a fire feed-water heater consisting of a series of water-tubes inclosed in said smoke-box, and connected together in pairs at one end, and at the other to multilocular headers at the front of the smoke-box, which are provided with openings and covers opposite the ends of the tubes, a multitubular exhaust-heater outside of said smoke-box, a conduit for conveying exhaust-steam to, and a cock or valve for discharging condensed water from, the exhaust-heater, means for supplying the exhaust-heater with feed-water, means for conveying feed-water from the exhaust-heater to the fire-heater, and a duct for conveying feed-water from the fire-heater to the boiler.

14. The combination of a steam-boiler, a multitubular exhaust feed-water heater, located below the boiler or smoke-box, and consisting of an exhaust-steam chamber of substantially a crescent form, with headers at each end having double plates with water-spaces between them, a system of bent heating-tubes in said chamber, connected by their ends to the inner plates of the headers, covered openings opposite to the ends of the tubes, giving ascess to them, means for conveying exhaust-steam to the heater, means for supplying it with feed-water and for conducting the water to the boiler, and a cock or valve for discharging water of condensation from the boiler.

15. The combination with a steam-boiler, of a fire-heater, provided with a plurality of passages through or around which feed-water may be circulated and a plurality of passages around or through which waste products of combustion may traverse before being discharged, and a receptacle communicating with the passages of the heater through which the products of combustion traverse, for the reception of solid matter separated from the products of combustion in such traverse.

16. The combination, with a steam-boiler, of a plurality of fire-heater tubes disposed in the smoke-box, means for effecting the traverse of waste products of combustion through or around said tubes in their traverse to the stack or discharge-flue, means for circulating feed-water around or through said tubes, and a receptacle located below the fire-heater tubes and open to the space through which the waste products of combustion traverse, for the reception of solid matter separated therefrom in passing through or around the fire-heater tubes.

17. The combination, with a steam-boiler, of a shell or casing communicating with and forming a forward extension of the smoke-box or uptake of the boiler, a tubular fire-heater inclosed in said casing, means for circulating feed-water through or around the tubes of said heater, a supporting-bar, mounted, with the capacity of longitudinal movement, on the casing, and means for suspending the fire-heater from the supporting-bar.

18. The combination, with a steam-boiler, of a shell or casing communicating with and forming a forward extension of the smoke-box or uptake of the boiler, a tubular fire-heater inclosed in said casing, means for circulating feed-water through or around the tubes of said heater, a supporting-bar, mounted, with the capacity of longitudinal movement on the casing, and a suspending-bolt by which the supporting-bar and fire-heater are connected with the capacity of relative pivotal motion.

19. The combination, with a steam-boiler, of a shell or casing communicating with and forming a forward extension of the smoke-box or uptake of the boiler, a tubular fire-heater inclosed in said casing, means for circulating feed-water through or around the tubes of said heater, upper and lower guide-rollers journaled on the casing, a supporting-bar fitted to traverse longitudinally between said guide-rollers, a bearing connected to the fire-heater and abutting against the supporting-bar, and a supporting-bolt connecting the fire-heater to the supporting-bar.

20. The combination of a steam-boiler, a smoke-box, a multitubular exhaust feed-water heater, consisting of an exhaust-steam heating-chamber, a system of heating-tubes in said chamber, means for conveying exhaust-steam to the heater, means for supplying it with feed-water and for conducting water to the boiler, a receptacle for sparks and cinders communicating with the passage for smoke and gas from the boiler to the chimney, and a duct for the passage of air and exhaust-steam from the heater to the spark-receptacle.

MATTHIAS N. FORNEY.

Witnesses:
J. SNOWDEN BELL,
PAUL SYNNESTVEDT.